(12) United States Patent
Fourcand

(10) Patent No.: US 9,106,439 B2
(45) Date of Patent: Aug. 11, 2015

(54) SYSTEM FOR TDM DATA TRANSPORT OVER ETHERNET INTERFACES

(71) Applicant: Futurewei Technologies, Inc., Plano, TX (US)

(72) Inventor: Serge Francois Fourcand, Fairview, TX (US)

(73) Assignee: Futurewei Technologies, Inc., Plano, UM (US)

( * ) Notice: Subject to any disclaimer, the term of this patent is extended or adjusted under 35 U.S.C. 154(b) by 204 days.

(21) Appl. No.: 13/649,820

(22) Filed: Oct. 11, 2012

(65) Prior Publication Data
US 2013/0044756 A1    Feb. 21, 2013

Related U.S. Application Data

(62) Division of application No. 11/735,591, filed on Apr. 16, 2007, now Pat. No. 8,340,101.

(60) Provisional application No. 60/826,764, filed on Sep. 25, 2006, provisional application No. 60/857,741, filed on Nov. 8, 2006, provisional application No. 60/886,833, filed on Jan. 26, 2007.

(51) Int. Cl.
*H04L 12/28*    (2006.01)
*H04L 12/40*    (2006.01)
(Continued)

(52) U.S. Cl.
CPC ......... *H04L 12/40156* (2013.01); *H04J 3/1682* (2013.01); *H04L 12/43* (2013.01)

(58) Field of Classification Search
CPC ............ H04L 12/5693; H04L 12/5602; H04L 12/5679; H04L 47/10; H04L 47/56; H04L 47/6215; H04L 67/325

USPC .......................... 370/395.4–395.43, 537–541
See application file for complete search history.

(56) References Cited

U.S. PATENT DOCUMENTS

| 5,303,241 A | 4/1994 | Takada et al. |
| 5,361,261 A | 11/1994 | Edem et al. |

(Continued)

FOREIGN PATENT DOCUMENTS

| CN | 1293843 A | 5/2001 |
| CN | 1352841 A1 | 6/2002 |

(Continued)

OTHER PUBLICATIONS

Office Action dated Apr. 24, 2013, 43 pages, U.S. Appl. No. 13/162,803, filed Jun. 17, 2011.

(Continued)

*Primary Examiner* — Thai Hoang
(74) *Attorney, Agent, or Firm* — Conley Rose, P.C.; Grant Rodolph; William H. Dietrich

(57) ABSTRACT

A network component comprising a processor configured to implement a method comprising promoting the communication of a frame of octet-sized timeslots, wherein the timeslots are configured to carry a plurality of data types. Also disclosed is a method comprising communicating a high priority data and a low priority data in a frame comprising a plurality of octet-sized timeslots, wherein each timeslot is assigned to the high priority data or the low priority data, wherein the high priority data is provided in the timeslots assigned to the high priority data, and wherein the low priority data is provided in the timeslots assigned to the low priority data. Also disclosed is a network component comprising a processor configured to implement a method comprising recognizing the reception of a plurality of data streams each having a priority, and promoting the multiplexing of the data streams based on the priority of each data stream.

20 Claims, 10 Drawing Sheets

| Timeslot Map | | Traffic Type |
|---|---|---|
| Bit 1 | Bit 0 | |
| 0 | 0 | BEP |
| 0 | 1 | TDM |
| 1 | 0 | HPF |
| 1 | 1 | Undefined |

(51) Int. Cl.
*H04J 3/16* (2006.01)
*H04L 12/43* (2006.01)

(56) References Cited

U.S. PATENT DOCUMENTS

| | | | |
|---|---|---|---|
| 5,367,524 A | 11/1994 | Rideout, Jr. et al. |
| 5,434,848 A | 7/1995 | Chimento, Jr. et al. |
| 5,696,798 A | 12/1997 | Wright et al. |
| 5,802,051 A | 9/1998 | Petersen et al. |
| 5,933,607 A | 8/1999 | Tate et al. |
| 6,049,541 A | 4/2000 | Kerns et al. |
| 6,108,307 A | 8/2000 | McConnell et al. |
| 6,233,237 B1 | 5/2001 | Yucebay et al. |
| 6,272,109 B1 | 8/2001 | Pei et al. |
| 6,320,877 B1 | 11/2001 | Humphrey et al. |
| 6,487,169 B1 | 11/2002 | Tada |
| 6,490,248 B1 | 12/2002 | Shimojo |
| 6,496,477 B1 | 12/2002 | Perkins et al. |
| 6,501,810 B1 | 12/2002 | Karim et al. |
| 6,570,890 B1 | 5/2003 | Keenan et al. |
| 6,570,891 B1 | 5/2003 | Arimilli |
| 6,577,631 B1 | 6/2003 | Keenan et al. |
| 6,633,566 B1 | 10/2003 | Pierson, Jr. |
| 6,674,750 B1 | 1/2004 | Castellano |
| 6,674,756 B1 | 1/2004 | Rao et al. |
| 6,693,909 B1 | 2/2004 | Mo et al. |
| 6,731,654 B1 | 5/2004 | Champion, Jr. et al. |
| 6,754,206 B1 | 6/2004 | Nattkemper et al. |
| 6,771,614 B1 | 8/2004 | Jones, IV et al. |
| 6,816,500 B1 | 11/2004 | Mannette et al. |
| 6,847,644 B1 | 1/2005 | Jha |
| 6,859,458 B2 | 2/2005 | Yuang et al. |
| 6,868,093 B1 | 3/2005 | Bohm et al. |
| 6,874,048 B2 | 3/2005 | Knapp et al. |
| 6,907,048 B1 | 6/2005 | Treadaway et al. |
| 6,944,163 B2 | 9/2005 | Bottorff et al. |
| 6,959,151 B1 | 10/2005 | Cotter et al. |
| 6,985,497 B2 | 1/2006 | Hsu et al. |
| 6,985,499 B2 | 1/2006 | Elliot |
| 6,999,479 B1 | 2/2006 | Jha |
| 7,007,099 B1 | 2/2006 | Donati et al. |
| 7,031,341 B2 | 4/2006 | Yu |
| 7,043,651 B2 | 5/2006 | Aweya et al. |
| 7,089,485 B2 | 8/2006 | Azadet et al. |
| 7,103,124 B1 | 9/2006 | Lindskog et al. |
| 7,139,338 B2 | 11/2006 | Wilson et al. |
| 7,188,189 B2 | 3/2007 | Karol et al. |
| 7,236,126 B2 | 6/2007 | Jeon et al. |
| 7,257,087 B2 | 8/2007 | Grovenburg |
| 7,305,002 B1 | 12/2007 | Ageby et al. |
| 7,324,537 B2 | 1/2008 | Samudrala et al. |
| 7,403,514 B1 | 7/2008 | Moulsley |
| 7,436,765 B2 | 10/2008 | Sisto et al. |
| 7,453,885 B2 | 11/2008 | Rogers |
| 7,463,709 B2 | 12/2008 | Raphaeli et al. |
| 7,496,112 B1 | 2/2009 | Danielson et al. |
| 7,519,747 B1 | 4/2009 | Cory et al. |
| 7,613,212 B1 | 11/2009 | Raz et al. |
| 7,646,710 B2 | 1/2010 | Christie, IV |
| 7,668,203 B1 | 2/2010 | Pannell et al. |
| 7,720,101 B2 | 5/2010 | Chapman et al. |
| 7,774,461 B2 | 8/2010 | Tanaka et al. |
| 7,986,700 B2 * | 7/2011 | Fourcand ............... 370/395.42 |
| 8,340,101 B2 * | 12/2012 | Fourcand ............... 370/395.42 |
| 8,416,770 B2 * | 4/2013 | Fourcand ............... 370/352 |
| 8,493,993 B2 | 7/2013 | Patel et al. |
| 2001/0043603 A1 | 11/2001 | Yu |
| 2001/0053130 A1 | 12/2001 | Tanaka et al. |
| 2001/0053149 A1 | 12/2001 | Mo et al. |
| 2002/0057709 A1 | 5/2002 | Edmon et al. |
| 2002/0068593 A1 | 6/2002 | Deltour et al. |
| 2002/0087716 A1 | 7/2002 | Mustafa |
| 2002/0131425 A1 | 9/2002 | Shalom |
| 2002/0141456 A1 | 10/2002 | Wang et al. |
| 2002/0163926 A1 | 11/2002 | Moharram |
| 2002/0167955 A1 | 11/2002 | Shimojo |
| 2002/0172200 A1 | 11/2002 | Shin et al. |
| 2002/0176389 A1 | 11/2002 | Colombo et al. |
| 2003/0095568 A1 | 5/2003 | Tominaga et al. |
| 2003/0117899 A1 | 6/2003 | Eidson |
| 2003/0147348 A1 | 8/2003 | Jiang |
| 2003/0161307 A1 | 8/2003 | Lo |
| 2003/0174700 A1 | 9/2003 | Ofek et al. |
| 2003/0179755 A1 | 9/2003 | Fraser |
| 2003/0214977 A1 | 11/2003 | Kuo |
| 2003/0219042 A1 | 11/2003 | Tosa |
| 2004/0001483 A1 | 1/2004 | Schmidt et al. |
| 2004/0001502 A1 | 1/2004 | Garmire et al. |
| 2004/0028408 A1 | 2/2004 | Cox et al. |
| 2004/0047367 A1 | 3/2004 | Mammen |
| 2004/0062265 A1 | 4/2004 | Poledna |
| 2004/0063401 A1 | 4/2004 | Meckelburg et al. |
| 2004/0066775 A1 | 4/2004 | Grovenburg |
| 2004/0071166 A1 | 4/2004 | Yen et al. |
| 2004/0076166 A1 | 4/2004 | Patenaude |
| 2004/0076186 A1 | 4/2004 | Chen et al. |
| 2004/0120438 A1 | 6/2004 | Forte |
| 2004/0151125 A1 | 8/2004 | Holmeide et al. |
| 2004/0177162 A1 | 9/2004 | Wetzel et al. |
| 2004/0179551 A1 | 9/2004 | Lentine et al. |
| 2004/0208554 A1 | 10/2004 | Wakai et al. |
| 2004/0213149 A1 | 10/2004 | Mascolo |
| 2004/0252688 A1 | 12/2004 | May et al. |
| 2005/0033947 A1 | 2/2005 | Morris et al. |
| 2005/0041691 A1 | 2/2005 | Laufer et al. |
| 2005/0099988 A1 | 5/2005 | Wang et al. |
| 2005/0117576 A1 | 6/2005 | McDysan et al. |
| 2005/0129028 A1 | 6/2005 | Peeters et al. |
| 2005/0141568 A1 | 6/2005 | Kwak et al. |
| 2005/0175013 A1 | 8/2005 | LePennec et al. |
| 2005/0190796 A1 | 9/2005 | Date et al. |
| 2005/0254484 A1 | 11/2005 | Barzegar et al. |
| 2005/0278457 A1 | 12/2005 | Hall et al. |
| 2005/0281217 A1 | 12/2005 | Mottier |
| 2006/0015507 A1 | 1/2006 | Butterworth et al. |
| 2006/0083265 A1 | 4/2006 | Jordan et al. |
| 2006/0092985 A1 | 5/2006 | Cho et al. |
| 2006/0104302 A1 | 5/2006 | Cho et al. |
| 2006/0109864 A1 | 5/2006 | Oksman |
| 2006/0123126 A1 | 6/2006 | Kim et al. |
| 2006/0176905 A1 | 8/2006 | Liu et al. |
| 2006/0182144 A1 | 8/2006 | Dove et al. |
| 2006/0233116 A1 | 10/2006 | Kyusojin et al. |
| 2006/0239300 A1 | 10/2006 | Hannel et al. |
| 2006/0256768 A1 | 11/2006 | Chan |
| 2006/0274791 A1 | 12/2006 | Garcia et al. |
| 2007/0008958 A1 | 1/2007 | Clemm et al. |
| 2007/0014372 A1 | 1/2007 | Hershbarger |
| 2007/0022209 A1 | 1/2007 | Delvai et al. |
| 2007/0031153 A1 | 2/2007 | Aronson et al. |
| 2007/0064587 A1 | 3/2007 | Langley et al. |
| 2007/0076605 A1 | 4/2007 | Cidon et al. |
| 2007/0097926 A1 | 5/2007 | Liu et al. |
| 2007/0121661 A1 | 5/2007 | Ohta et al. |
| 2007/0140127 A1 | 6/2007 | Frei |
| 2007/0192515 A1 | 8/2007 | Kraus |
| 2007/0201356 A1 | 8/2007 | Liao et al. |
| 2007/0201365 A1 | 8/2007 | Skoog et al. |
| 2007/0206602 A1 | 9/2007 | Halabi et al. |
| 2007/0206603 A1 | 9/2007 | Weich et al. |
| 2007/0206604 A1 | 9/2007 | Best et al. |
| 2007/0206709 A1 | 9/2007 | Kermosh et al. |
| 2007/0211720 A1 | 9/2007 | Fuchs et al. |
| 2007/0211750 A1 | 9/2007 | Li et al. |
| 2007/0222648 A1 | 9/2007 | Sontag et al. |
| 2007/0258419 A1 | 11/2007 | Zhao et al. |
| 2007/0297375 A1 | 12/2007 | Bonta et al. |
| 2007/0299987 A1 | 12/2007 | Parker et al. |
| 2008/0031136 A1 | 2/2008 | Gavette et al. |
| 2008/0043732 A1 | 2/2008 | Desai et al. |
| 2008/0071924 A1 | 3/2008 | Chilukoor |
| 2008/0074996 A1 | 3/2008 | Fourcand |
| 2008/0075002 A1 | 3/2008 | Fourcand |
| 2008/0075069 A1 | 3/2008 | Fourcand |

(56) References Cited

U.S. PATENT DOCUMENTS

| | | | |
|---|---|---|---|
| 2008/0075110 A1 | 3/2008 | Fourcand | |
| 2008/0075120 A1 | 3/2008 | Fourcand | |
| 2008/0075121 A1 | 3/2008 | Fourcand | |
| 2008/0075122 A1 | 3/2008 | Fourcand | |
| 2008/0075123 A1* | 3/2008 | Fourcand | 370/503 |
| 2008/0075124 A1 | 3/2008 | Fourcand | |
| 2008/0075127 A1 | 3/2008 | Fourcand | |
| 2008/0075128 A1 | 3/2008 | Fourcand | |
| 2008/0123541 A1 | 5/2008 | Dielissen et al. | |
| 2008/0130689 A1 | 6/2008 | Kumar et al. | |
| 2008/0137675 A1 | 6/2008 | Pauwels | |
| 2008/0181114 A1 | 7/2008 | Fourcand | |
| 2008/0250469 A1 | 10/2008 | Agnoli et al. | |
| 2009/0168797 A1 | 7/2009 | Danielson et al. | |
| 2009/0254685 A1 | 10/2009 | Diepstraten et al. | |
| 2009/0274172 A1 | 11/2009 | Shen et al. | |
| 2010/0135314 A1 | 6/2010 | Fourcand | |
| 2010/0135315 A1 | 6/2010 | Fourcand | |
| 2010/0284421 A1 | 11/2010 | Fourcand | |
| 2010/0316069 A1 | 12/2010 | Fourcand | |
| 2011/0255402 A1 | 10/2011 | Fourcand | |

FOREIGN PATENT DOCUMENTS

| | | | |
|---|---|---|---|
| CN | 1512683 A | 7/2004 | |
| CN | 1516463 A | 7/2004 | |
| CN | 1522077 A | 8/2004 | |
| CN | 1522510 A | 8/2004 | |
| CN | 1529471 A | 9/2004 | |
| CN | 1571348 A | 1/2005 | |
| CN | 1575568 A | 2/2005 | |
| CN | 1601951 A | 3/2005 | |
| CN | 1710828 A | 12/2005 | |
| CN | 1728720 A | 2/2006 | |
| CN | 1767499 A | 5/2006 | |
| CN | 1770673 A | 5/2006 | |
| CN | 1773887 A | 5/2006 | |
| CN | 1788501 A | 6/2006 | |
| CN | 1855935 A | 11/2006 | |
| EP | 1091529 A2 | 4/2001 | |
| EP | 1655885 A1 | 5/2006 | |
| EP | 1771027 A1 | 4/2007 | |
| GB | 2366161 A | 2/2002 | |
| JP | 2003188912 A | 7/2003 | |
| WO | 9956422 A1 | 11/1999 | |
| WO | 02099578 A | 12/2002 | |
| WO | 03017543 A1 | 2/2003 | |
| WO | 03032539 A1 | 4/2003 | |
| WO | 03087984 A2 | 10/2003 | |
| WO | 2005101755 A1 | 10/2005 | |
| WO | 2006032583 A1 | 3/2006 | |
| WO | 2006051465 A1 | 5/2006 | |
| WO | 2006056415 A1 | 6/2006 | |

OTHER PUBLICATIONS

Foreign Communication From a Related Counterpart Application, Chinese Application 200880000770.9, Chinese Office Action dated Mar. 19, 2013, 8 pages.
Foreign Communication From a Related Counterpart Application, Chinese Application 200880000770.9, Partial English Translation Office Action dated Mar. 19, 2013, 7 pages.
Office Action dated Sep. 18, 2013, 7 pages, U.S. Appl. No. 12/862,521, filed Aug. 24, 2010.
Office Action dated Nov. 13, 2013, 15 pages, U.S. Appl. No. 13/162,803, filed Jun. 17, 2011.
Foreign Communication From a Counterpart Application, Chinese Application No. 200880000770.9, Chinese Office Action dated Jul. 26, 2013, 8 pages.
Foreign Communication From a Counterpart Application, Chinese Application No. 200880000770.9, Partial English Translation of Chinese Office Action dated Jul. 26, 2013, 9 pages.
Notice of Allowance dated May 22, 2013, 18 pages, U.S. Appl. No. 11/735,592, filed Apr. 16, 2007.
Office Action dated Mar. 13, 2013, 27 pages, U.S. Appl. No. 11/737,800, filed Apr. 20, 2007.
Office Action dated Apr. 3, 2013, 58 pages, U.S. Appl. No. 12/842,794, filed Jul. 23, 2010.
Office Action dated Jun. 4, 2013, 6 pages, U.S. Appl. No. 13/162,803, filed Jun. 17, 2011.
Office Action dated Jun. 18, 2013, 18 pages, U.S. Appl. No. 12/842,794, filed Jul. 23, 2010.
Notice of Allowance dated Jul. 30, 2013, 9 pages, U.S. Appl. No. 11/737,800, filed Apr. 20, 2007.
Notice of Allowance dated Aug. 1, 2013, 12 pages, U.S. Appl. No. 12/842,794, filed Jul. 23, 2010.
Notice of Allowance dated Jun. 20, 2013, 40 pages, U.S. Appl. No. 13/271,691, filed Oct. 12, 2011.
Office Action dated Aug. 2, 2013, 5 pages, U.S. Appl. No. 13/162,803, filed Jun. 17, 2011.
Office Action dated Sep. 3, 2013, 6 pages, U.S. Appl. No. 11/737,800, filed Apr. 20, 2007.
Notice of Allowance dated Nov. 26, 2013, 38 pages, U.S. Appl. No. 11/735,596, filed Apr. 16, 2007.
Office Action dated Dec. 26, 2013, 30 pages, U.S. Appl. No. 12/862,521, filed Aug. 24, 2010.
Office Action dated Mar. 5, 2014, 20 pages, U.S. Appl. No. 13/162,803, filed Jun. 17, 2011.
Notice of Allowance dated Aug. 24, 2010, 14 pages, U.S. Appl. No. 11/735,598, filed Apr. 16, 2007.
Office Action dated Oct. 16, 2012, 40 pages, U.S. Appl. No. 12/862,521, filed Aug. 24, 2012.
Office Action dated Feb. 1, 2013, 4 pages, U.S. Appl. No. 12/862,521, filed Aug. 24, 2010.
Office Action dated Sep. 18, 2009, 13 pages, U.S. Appl. No. 11/735,602, filed Apr. 16, 2007.
Office Action dated Feb. 22, 2010, 21 pages, U.S. Appl. No. 11/735,602, filed Apr. 16, 2007.
Office Action dated Jul. 29, 2010 15 pages, U.S. Appl. No. 11/735,602, filed Apr. 16, 2007.
Notice of Allowance dated Apr. 11, 2011 8 pages, U.S. Appl. No. 11/735,602, filed Apr. 16, 2007.
Office Action dated Sep. 15, 2009, 13 pages, U.S. Appl. No. 11/735,604, filed Apr. 16, 2007.
Office Action dated Feb. 17, 2010, 24 pages, U.S. Appl. No. 11/735,604, filed Apr. 16, 2007.
Office Action dated Jul. 29, 2010, 15 pages, U.S. Appl. No. 11/735,604, filed Apr. 16, 2007.
Office Action dated May 24, 2011, 14 pages, U.S. Appl. No. 11/735,604, filed Apr. 16, 2007.
Office Action dated Oct. 29, 2009, 9 pages, U.S. Appl. No. 11/735,605.
Office Action dated Mar. 3, 2010, 20 pages, U.S. Appl. No. 11/735,605.
Office Action dated Jun. 22, 2010, 18 pages, U.S. Appl. No. 11/735,605.
Office Action dated Oct. 27, 2010, 14 pages, U.S. Appl. No. 11/735,605.
Office Action—Notice of Allowance—dated Mar. 17, 2011, 9 pages, U.S. Appl. No. 11/735,605.
Office Action dated Jun. 26, 2009, 15 pages, U.S. Appl. No. 11/737,803, filed Apr. 20, 2007.
Office Action—Notice of Allowance—dated Dec. 29, 2009, 16 pages U.S. Appl. No. 11/737,803, filed Apr. 20, 2007.
Notice of Allowance dated Oct. 16, 2012, 42 pages U.S. Appl. No. 12/691,367, filed Jan. 21, 2010.
Foreign Communication From a Related Counterpart Application—International Search Report and Written Opinion, PCT/CN20081070037, Apr. 17, 2008, 10 pages.
Foreign Communication From a Related Counterpart Application—International Search Report and Written Opinion, PCT/CN2008/070038, Apr. 17, 2008, 6 pages.
Foreign Communication From a Related Counterpart Application—International Search Report and Written Opinion, PCT/CN2008/070045, Apr. 17, 2008, 7 pages.

(56) References Cited

OTHER PUBLICATIONS

Foreign Communication From a Related Counterpart Application—International Search Report and Written Opinion, PCT/CN2008/070046, Apr. 17, 2008, 6 pages.
Foreign Communication From a Related Counterpart Application—International Search Report and Written Opinion, PCT/CN2008/070183, May 8, 2008, 11 pages.
Foreign Communication From a Related Counterpart Application—International Search Report and Written Opinion, PCT/CN2008/070632, Jul. 10, 2008, 5 pages.
Foreign Communication From a Related Counterpart Application—International Search Report and Written Opinion, PCT/CN20081070630, Jul. 3, 2008, 8 pages.
Foreign Communication From a Related Counterpart Application—International Search Report and Written Opinion, PCT/CN20081070690, Jul. 17, 2008, 7 pages.
Foreign Communication From a Related Counterpart Application—International Search Report and Written Opinion, PCT/CN2008/070717, Jul. 24, 2008, 10 pages.
Foreign Communication From a Related Counterpart Application—International Search Report and Written Opinion, PCT/CN2008/070017, Apr. 3, 2008, 6 pages.
Foreign Communication From a Related Counterpart Application—International Search Report and Written Opinion, PCT/CN20081070005, Apr. 10, 2008, 9 pages.
Foreign Communication From a Related Counterpart Application—International Search Report and Written Opinion, PCT/CN2008/070007, Apr. 17, 2008, 8 pages.
Foreign Communication From a Related Counterpart Application—European Application No. 08700043.6, Supplementary European Search Report and Written Opinion dated Oct. 29, 2009, 7 pages.
Foreign Communication From a Related Counterpart Application—European Application No. 08700043.6, European Office Action dated Jul. 20, 2012, 7 pages.
Foreign Communication From a Related Counterpart Application—European Search Report, EP Application 08700032.9, Dec. 2, 2009, 7 pages.
Foreign Communication From a Related Counterpart Application—European Application No. 08700032.9, European Office Action dated Jun. 11, 2012, 10 pages.
Foreign Communication from a counterpart application, Chinese application 200880001140.3, Office Action dated Feb. 9, 2011, 5 pages.
Foreign Communication from a counterpart application, Chinese application 200880001140.3, Partial English Translation Office Action dated Feb. 9, 2011, 7 pages.
Foreign Communication from a counterpart application, Chinese application 200880000770.9, Office Action dated Dec. 14, 2010, 7 pages.
Foreign Communication from a counterpart application, Chinese application 200880000770.9, Partial English Translation Office Action dated Dec. 14, 2010, 6 pages.
Foreign Communication From a Related Counterpart Application, Chinese Application 200880001609.3, Chinese Office Action dated Oct. 28, 2011, 4 pages.
Foreign Communication From a Related Counterpart Application, Chinese Application 200880001609.3, Translation of First Chinese Office Action dated Oct. 28, 2011, 3 pages.
Foreign Communication From a Related Counterpart Application, Chinese Application 200880002509.2, Chinese Office Action dated May 19, 2011, 4 pages.
Foreign Communication From a Related Counterpart Application, Chinese Application 2008800025092, Partial English Translation Office Action dated May 19, 2011, 2 pages.
Notice of Allowance dated Aug. 13, 2012, 25 pages, U.S. Appl. No. 11/735,591, filed Apr. 16, 2007.
Office Action dated Aug. 6, 2012, 25 pages, U.S. Appl. No. 11/735,596, filed Apr. 16, 2007.
Notice of Allowance dated Jul. 30, 2012, 42 pages, U.S. Appl. No. 12/691,372, filed Jan. 21, 2010.

Foreign Communication From a Related Counterpart Application, Chinese Application 200880000770.9, Office Action dated Oct. 9, 2012, 5 pages.
Foreign Communication From a Related Counterpart application, Chinese application 200880000770.9, Partial English Translation Office Action dated Oct. 9, 2012, 5 pages.
Precise Networked Clock Synchronization Working Group of the IM/ST Committee, IEEE P1588™ D2.2, "Draft Standard for a Precision Clock Synchronization Protocol for Networked Measurement and Control Systems," 2007, 305 pages, IEEE Standards Activities Department, Piscataway, NJ.
IEEE Standard for Infomration Technology—Telecommunications and Information Exchange Between Systems—Local and Metropolitan Area Networks—Specific Requirement Part 3: Carrier Sense Multiple Access with Collision Detection (CSMA/CD) Access and Physical Layer Specifiactions—IEEE Computer Society, IEEE std. 802.3-2008, Dec. 26, 2008—Section 1.
IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifiactions—IEEE Computer Society, IEEE std. 802.3-2008, Dec. 26, 2009—Section 2.
IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifiactions—IEEE Computer Society, IEEE std. 802.3-2008, Dec. 26, 2008—Section 3.
IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Phyiscal Layer Specifications—IEEE Computer Society, IEEE Std. 802.3-2008, Dec. 26, 2008—Section 4.
IEEE Standard for Information Technology—Telecommunications and Information Exchange Between Systems—Local and Metropolitan Area Networks—Specific Requirement Part 3: Carrier Sense Multiple Access Collision Detection (CSMA/CD) Access Method and Physical Layer Specification—IEEE Computer Society, IEEE Std. 802.3-2008, Dec. 26, 2008—Section 5.
Krzyanowski, "Lectures on Distributed Systems Clock Synchronization," Rutgers University—CS 417: Distributed Systems, copyright 2000-2009, 14 pages.
National Instruments, "Introduction to Distributed Clock Synchronization and the IEEE 1588 Precision Time Protocol," http://zone.ni.com/devzone/cda/tut/p/id/2822, May 14, 2008, pp. 1-4.
Pratt G., et al., "Distributed Synchronous Clocking," IEEE Transactions on Parallel and Distributed Systems, vol. 6, No. 3, Mar. 1995, pp. 314-328.
Wikipedia, "TTEthernet," http://en.wikipedia.org/wiki/TTEthernet, Retrieved Dec. 22, 2011.
Fourcand, Serge Francois; U.S. Appl. No. 13/624,625; Title: "Inter-Packet Gap Network Clock Synchronization"; filed Sep. 21, 2012.
Office Action dated May 12, 2009, 15 pages, U.S. Appl. No. 11/737,800, filed Apr. 20, 2007.
Office Action dated Nov. 23, 2009, 19 pages, U.S. Appl. No. 11/737,800, filed Apr. 20, 2007.
Office Action dated Aug. 7, 2009, 10 pages, U.S. Appl. No. 11/735,590, filed Apr. 16, 2007.
Office Action dated Dec. 30, 2009, 22 pages, U.S. Appl. No. 11/735,590, filed Apr. 16, 2007.
Office Action dated Jun. 9, 2010, 13 pages, U.S. Appl. No. 11/735,590, filed Apr. 16, 2007.
Office Action dated Jan. 11, 2011, 10 pages, U.S. Appl. No. 11/735,590, filed Apr. 16, 2007.
Office Action dated Feb. 1, 2011, 10 pages, U.S. Appl. No. 11/735,590, filed Apr. 16, 2007.
Office Action dated Jun. 3, 2011, 17 pages, U.S. Appl. No. 11/735,590, filed Apr. 16, 2007.
Notice of Allowance dated Jun. 21, 2012, 11 pages, U.S. Appl. No. 11/735,590, filed Apr. 16, 2007.

(56) References Cited

OTHER PUBLICATIONS

Office Action dated Sep. 23, 2009, 10 pages, U.S. Appl. No. 11/735,591, filed Apr. 16, 2007.
Office Action dated Jan. 6, 2010, 19 pages, U.S. Appl. No. 11/735,591, filed Apr. 16, 2007.
Office Action dated Jan. 13, 2011, 10 pages, U.S. Appl. No. 11/735,591, filed Apr. 16, 2007.
Office Action dated Jun. 17, 2011, 20 pages, U.S. Appl. No. 11/735,591, filed Apr. 16, 2007.
Office Action dated Mar. 6, 2012, 13 pages, U.S. Appl. No. 11/735,591, filed Apr. 16, 2007.
Office Action dated Jul. 1, 2011, 18 pages, U.S. Appl. No. 11/737,800, filed Apr. 20, 2007.
Office Action dated Nov. 21, 2011, 5 pages, U.S. Appl. No. 11/737,800, filed Apr. 20, 2007.
Office Action dated May 25, 2012, 8 pages, U.S. Appl. No. 11/737,800, filed Apr. 20, 2007.
Office Action dated Aug. 21, 2012, 17 pages, U.S. Appl. No. 11/737,800, filed Apr. 20, 2007.
Office Action dated Jun. 20, 2012, 44 pages, U.S. Appl. No. 13/271,691, filed Oct. 12, 2011.
Final Office Action dated Jan. 4, 2013, 27 pages, U.S. Appl. No. 13/271,691, filed Oct. 12, 2011.
Office Action dated Aug. 5, 2009, 21 pages, U.S. Appl. No. 11/739,316, filed Apr. 24, 2007.
Office Action dated Mar. 25, 2010, 22 pages, U.S. Appl. No. 11/739,316, filed Apr. 24, 2007.
Notice of Allowance dated Aug. 19, 2010, 16 pages, U.S. Appl. No. 11/739,316, filed Apr. 24, 2007.
Office Action dated Feb. 26, 2010, 22 pages, U.S. Appl. No. 11/971,386, filed Jan. 9, 2008.
Notice of Allowance dated Jul. 19, 2010, 12 pages, U.S. Appl. No. 11/971,386, filed Jan. 9, 2008.
Office Action dated Sep. 2, 2009, 13 pages, U.S. Appl. No. 11/735,592, filed Apr. 16, 2007.
Office Action dated Feb. 18, 2010, 22 pages, U.S. Appl. No. 11/735,592, filed Apr. 16, 2007.
Office Action dated Aug. 4, 2010, 9 pages, U.S. Appl. No. 11/735,592, filed Apr. 16, 2007.
Office Action dated Jan. 3, 2011, 16 pages, U.S. Appl. No. 11/735,592, filed Apr. 16, 2007.
Office Action dated Aug. 3, 2011, 11 pages, U.S. Appl. No. 11/735,592, filed Apr. 16, 2007.
Office Action dated Jan. 23, 2012, 12 pages, U.S. Appl. No. 11/735,592, filed Apr. 16, 2007.
Office Action dated Sep. 3, 2009, 15 pages, U.S. Appl. No. 11/735,596, filed Apr. 16, 2007.
Office Action dated Feb. 2, 2010, 23 pages, U.S. Appl. No. 11/735,596, filed Apr. 16, 2007.
Office Action dated Jun. 9, 2011, 17 pages, U.S. Appl. No. 11/735,596, filed Apr. 16, 2007.
Office Action dated Oct. 25, 2011, 29 pages, U.S. Appl. No. 11/735,596, filed Apr. 16, 2007.
Final Office Action dated Jan. 14, 2013, 15 pages, U.S. Appl. No. 11/735,596 filed Apr. 16, 2007.
Office Action dated Sep. 30, 2009, 15 pages, U.S. Appl. No. 11/735,598, filed Apr. 16, 2007.
Office Action dated Feb. 17, 2010, 23 pages, U.S. Appl. No. 11/735,598, filed Apr. 16, 2007.
Notice of Allowance dated Jun. 1, 2010, 8 pages, U.S. Appl. No. 11/735,598, filed Apr. 16, 2007.
Office Action dated Jul. 3, 2014, 7 pages, U.S. Appl. No. 13/624,625, filed Sep. 21, 2012.
Notice of Allowance dated Dec. 19, 2014, 11 pages, No. 13/624,625, filed Sep. 21, 2012.

* cited by examiner

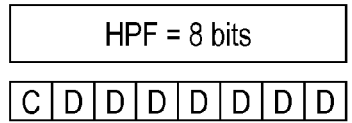
Fig. 4
Fig. 5
| | | Column X | | | | | | | | Column X+1 | | | | | | | | Column X+2 | | | | | | | |
| --- | --- | --- | --- | --- | --- | --- | --- | --- | --- | --- | --- | --- | --- | --- | --- | --- | --- | --- | --- | --- | --- | --- | --- | --- | --- |
| | | Bit | | | | | | | | Bit | | | | | | | | Bit | | | | | | | |
| | | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| Row | 1 | 1 | D6 | D7 | D0 | D1 | D2 | D3 | D4 | 1 | D5 | D6 | D7 | 0 | 0 | 0 | 0 | 0 | BEP | | | | | | |
| | 2 | 0 | BEP | | | | | | | 0 | BEP | | | | | | | 0 | BEP | | | | | | |
| | 3 | 0 | BEP | | | | | | | 0 | BEP | | | | | | | 0 | BEP | | | | | | |
| | 4 | 0 | BEP | | | | | | | 1 | D0 | D1 | D2 | D3 | D4 | D5 | D6 | 1 | D7 | D0 | D1 | D2 | D3 | D4 | D5 |
| | 5 | 1 | D6 | D7 | D0 | D1 | D2 | D3 | D4 | 1 | D5 | D6 | D7 | D0 | D1 | D2 | D3 | 1 | D4 | D5 | D6 | D7 | D0 | D1 | D2 |
| | 6 | 1 | D3 | D4 | D5 | D6 | D7 | D0 | D1 | 1 | D2 | D3 | D4 | D5 | D6 | D7 | D0 | 1 | D1 | D2 | D3 | D4 | D5 | D6 | D7 |
| | 7 | 1 | D0 | D1 | D2 | D3 | D4 | D5 | D6 | 1 | D7 | D0 | D1 | D2 | D3 | D4 | D5 | 1 | D6 | D7 | D0 | D1 | D2 | D3 | D4 |
| | 8 | 1 | D5 | D6 | D7 | D0 | D1 | D2 | D3 | 1 | D4 | D5 | D6 | D7 | D0 | D1 | D2 | 1 | D3 | D4 | D5 | D6 | D7 | D0 | D1 |
| | 9 | 1 | D2 | D3 | D4 | D5 | D6 | D7 | D0 | 1 | D1 | D2 | D3 | D4 | D5 | D6 | D7 | 1 | D0 | D1 | D2 | D3 | D4 | D5 | D6 |
Fig. 6

| Timeslot Map | Traffic |
| Bit 0 | Type |
| --- | --- |
| 0 | Low Priority |
| 1 | High Priority |

| Timeslot Map | | Traffic |
| Bit 1 | Bit 0 | Type |
| --- | --- | --- |
| 0 | 0 | BEP |
| 0 | 1 | TDM |
| 1 | 0 | HPF |
| 1 | 1 | Undefined |

SYSTEM FOR TDM DATA TRANSPORT OVER ETHERNET INTERFACES

CROSS-REFERENCE TO RELATED APPLICATIONS

This application is a divisional of U.S. patent application Ser. No. 11/735,591 filed Apr. 16, 2007, now U.S. Pat. No. 8,340,101 issued Dec. 25, 2012, and entitled "Multiplexed Data Stream Payload Format," which claims priority to U.S. Provisional Application Ser. No. 60/826,764 filed Sep. 25, 2006 and entitled "System for TDM Data Transport Over Ethernet Interfaces," U.S. Provisional Application Ser. No. 60/857,741 filed Nov. 8, 2006 and entitled "TDM Data Transport Over Ethernet," and U.S. Provisional Application Ser. No. 60/886,833 filed Jan. 26, 2007 and entitled "Closed Loop Clock Synchronization," all of which are by Serge F. Fourcand and are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet is flexible in that it allows variable-sized data packets to be transported across different types of mediums using various nodes each having different transmission speeds. Ethernet is decentralized in that it allows the end devices to transmit and receive data without oversight or intervention from a centralized server or party. Furthermore, Ethernet is scalable in that it can be implemented in both small-scale and large-scale networks. These advantages make Ethernet a preferred choice for data distribution in many computer networks.

Unfortunately, Ethernet does have some drawbacks. When Ethernet packets are transported through the network, the Ethernet packets contend with other traffic being transported over the same links or through the same nodes. The contentious traffic not only includes packets bound for the same destination, but also packets bound for other destinations that are transported over the same link or through the same node as the Ethernet packet. This contention produces burstiness and jitter at the nodes within the network. Some of these problems can be addressed by using resource arbitration and buffers at the nodes, and by prioritizing the packets into high priority data and low priority data. However, these solutions increase network complexity, increase delay, and detract from the inherent advantages of Ethernet.

The aforementioned drawbacks are part of the reason Ethernet has not been widely implemented in networks carrying time division multiplexed (TDM) data. Specifically, Ethernet does not provide a sufficient Quality of Service (QoS) to meet the stringent jitter and data loss requirements for voice traffic in the public switched telephone network (PSTN) and other TDM networks. Instead, TDM traffic is carried by highly synchronized networks, such as synchronous optical networks (SONET) and synchronous digital hierarch (SDH) networks. Various Ethernet enhancements, such as circuit emulation, provider backbone transport, and pseudowires, have been proposed to address the jitter and data loss issues, but these enhancements fail to couple the flexibility of Ethernet with the high QoS requirements of TDM networks. Thus, a need exists for an improved Ethernet protocol that is flexible, easy to implement, supports the QoS requirements of TDM networks, and is compatible with existing technology.

SUMMARY

In one aspect, the disclosure includes a network component comprising a processor configured to implement a method comprising promoting the communication of a frame of octet-sized timeslots, wherein the timeslots are configured to carry a plurality of data types.

In another aspect, the disclosure includes a method comprising communicating a high priority data and a low priority data in a frame comprising a plurality of octet-sized timeslots, wherein each timeslot is assigned to the high priority data or the low priority data, wherein the high priority data is provided in the timeslots assigned to the high priority data, and wherein the low priority data is provided in the timeslots assigned to the low priority data.

In a third aspect, the disclosure includes a network component comprising a processor configured to implement a method comprising recognizing the reception of a plurality of data streams each having a priority, and promoting the multiplexing of the data streams based on the priority of each data stream.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is an illustration of an embodiment of a bandwidth reuse encoding for high priority flow timeslots.

FIG. 5 is an illustration of an embodiment of a plurality of timeslots communicating high priority flow data.

FIG. 6 is an illustration of an embodiment of a data stream that reuses bandwidth in idle high priority flow timeslots.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the examples of designs and implementations illustrated and described herein, but may be modified within the scope of the appended claims along with their full scope of equivalents.

Disclosed herein is an operational mode that multiplexes different data types using an overlay synchronous timeslot scheme, referred to herein as a Huawei time division multiplexed (H-TDM) operational mode. The overlay synchronous timeslot scheme may time division multiplex timestamp data, control data, and payload data in octet-sized timeslots within a predefined synchronization window. The payload data may include a plurality of data types, such as time division multiplexed (TDM) data, high performance flow (HPF) data, and best-effort packet (BEP) data. When multiple data types are included in the payload, a timeslot map may indicate the type and location of the different data types. The overlay synchronous timeslot scheme may allow high priority data to be transported through a network in a deterministic manner and without contention, thereby meeting the QoS requirements of the PSTN. The overlay synchronous timeslot scheme also promotes the efficient use of bandwidth by allowing low priority data to use timeslots that are assigned to the high priority data when the high priority data is idle. The overlay synchronous timeslot scheme also enables efficient mapping of data between Ethernet nodes and SONET or SDH nodes.

Further disclosed herein is a circuit architecture that multiplexes a plurality of data sources into the overlay synchronous timeslot scheme. The circuit architecture provides priority specific buffering such that low priority data may be buffered at the nodes while high priority data passes through the nodes without being buffered. The circuit architecture also provides backpressure flow control to maintain an optimal capacity of the buffers in the nodes.

Figure 1:
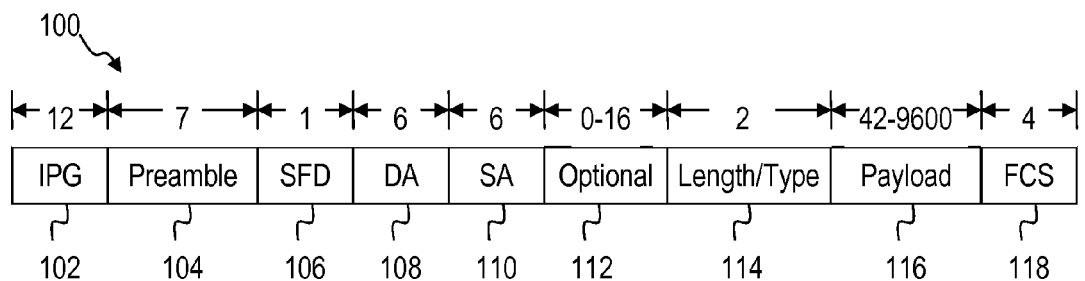
FIG. 1 is an illustration of an embodiment of an Ethernet MAC frame.

FIG. 1 illustrates one embodiment of an Ethernet packet 100. The packet 100 begins with a preamble 104, which may be about seven octets of a repeated pattern, such as "10101010." The preamble 104 may allow a node's physical layer signaling (PLS) circuitry to reach steady-state synchronization with the packet's timing. The preamble 104 may be followed by a start of frame delimiter (SFD) 106, which may be a single octet with the pattern "10101011," and may be used to indicate the start of the packet 100. The destination address (DA) 108 may specify the address of the destination node for which the packet 100 is intended, and may be about six octets. The source address (SA) 110 may specify the address of the source node from which the packet 100 originated, and may be about six octets. The packet 100 may contain a plurality of optional octets 112 that are used to associate the packet 100 with a type protocol identifier (TPID) and/or a virtual local area network identifier (VID). For example, up to about sixteen octets may be used for associating the packet 100 with a TPID and a VID, for example, as described in IEEE 802.1Q.

The packet 100 continues with a length/type field 114, which may specify the length of the payload 116 and the Ethernet protocol being used, and may be about two octets. The payload 116 may be a variable-sized field that carries a data payload. Although the payload 116 may contain any amount of data, in specific embodiments the payload 116 may contain from about 42 octets to about 1,500 octets in standard packets, and may contain from about 9,000 octets to about 12,000 octets in jumbo packets. The frame check sequence (FCS) 118 may be used for error detection, and may be a four-octet field that contains a cyclic redundancy check (CRC) value calculated using the contents of the packet 100. Although not part of the packet 100, the inter-packet gap (IPG) 102 may be data or idle characters that separate the packets 100. The IPG 102 may contain about twelve octets of idle control characters, although any amount of data or idle characters may be used in the IPG 102.

Figure 2A:
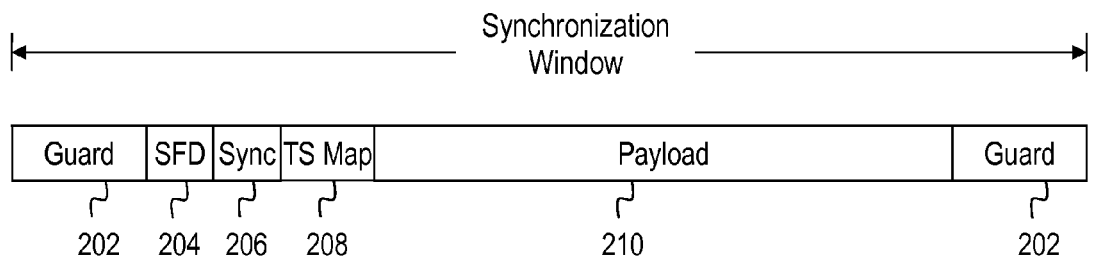
FIG. 2A is an illustration of one embodiment of an H-TDM frame.

FIG. 2A depicts one embodiment of the overlay synchronous timeslot scheme of the H-TDM operational mode. Specifically, FIG. 2A illustrates an overlay synchronous timeslot scheme within a synchronization window having a predefined period, such as about 125 microseconds (µs). The overlay synchronous timeslot scheme comprises a start of frame delimiter (SFD) 204, a synchronization timestamp (Sync) 206, a timeslot map (TS Map) 208, and a payload 210. The SFD 204 may delineate a beginning of the H-TDM frame, and may be a reserved Ethernet control symbol, such as the /K28.1/ control symbol. As persons of ordinary skill in the art will recognize, the /K28.1/ control symbol includes a comma that may be used to enable 8 bit/10 bit (8 B/10 B) symbol synchronization when the overlay synchronous timeslot scheme is communicated on 8 B/10 B encoded media. In an embodiment, the SFD 204 may also specify the size of the H-TDM frame. The Sync 206 follows the SFD 204, and may be used to initiate the synchronization windows, synchronize the synchronization windows, and phase-align the synchronization windows between two nodes. A detailed description of the Sync 206, the frequency-synchronization process, and the phase-alignment process is found in U.S. patent application Ser. No. 11/735,590 entitled "Inter-Packet Gap Network Clock Synchronization."

The overlay synchronous timeslot scheme may continue with the TS Map 208, which may specify the type and location of the data in the payload 210. In one embodiment, the individual timeslots in the payload 210 may be assigned to TDM, HPF, and BEP traffic according to a predefined pattern. For example, the first one thousand timeslots may be assigned to TDM traffic, the subsequent five thousand timeslots may be assigned to HPF traffic, and the subsequent three thousand timeslots may be assigned to BEP traffic. In such an embodiment, the TS Map 208 may be omitted from the H-TDM frame if the nodes are aware of the predefined pattern. Alternatively, the TS Map 208 may indicate the assignment of each timeslot in the payload 210 as a TDM, a HPF, or a BEP timeslot. Using the TS Map 208, TDM, HPF, and BEP traffic may be dynamically interleaved within the overlay synchronous timeslot scheme.

Some timeslots at the beginning and/or end of the synchronization window may be part of a guard interval 202. The guard intervals 202 allow the H-TDM frame to float within the synchronization window. Specifically, the location of SFD 204 in relation to the start of the synchronization window may vary between synchronization windows. As such, the guard interval 202 at the beginning of the synchronization window may be the same or a different size than the guard interval 202 at the end of the synchronization window, and the size of the guard intervals 202 in one synchronization window may vary from the size of the guard intervals 202 in other synchronization windows. Such an embodiment may be advantageous because the integrity of the SFD 204, Sync 206, TS Map 208, and the data in the payload 210 is maintained if any of the data in the guard intervals 202 is dropped, corrupted, lost, or otherwise unreadable, for example, due to clock tolerances or other non-deterministic factors. In some embodiments, the guard interval 202 may transport low priority BEP data. Alternatively, the guard interval 202 may be zero-padded or may contain idle characters.

Figure 2B:
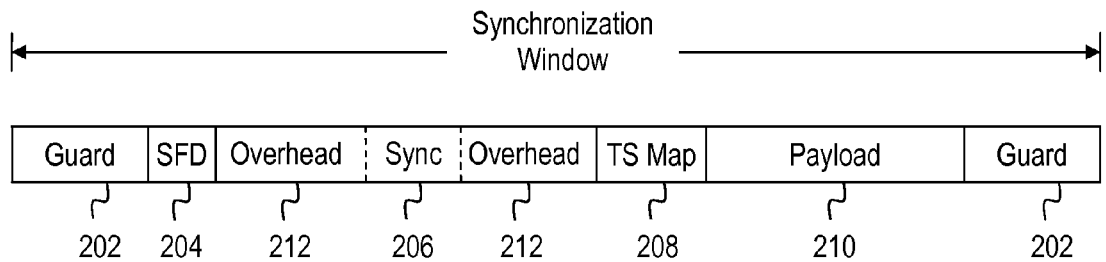
FIG. 2B is an illustration of another embodiment of the H-TDM frame.

Although the synchronization window may be any duration, there are particular advantages to using a synchronization window with a period of about 125 μs. Specifically, synchronizing the overlay synchronous timeslot schemes to a 125 μs synchronization window enables the Ethernet nodes to be interoperable with the PSTN, SONET, SDH, and other TDM networks. As such, when the overlay synchronous timeslot scheme has a 125 μs window, SONET/SDH transport overhead may be added to the overlay synchronous timeslot scheme format. FIG. 2B illustrates an overlay synchronous timeslot scheme containing SONET/SDH transport overhead 212. The SONET/SDH transport overhead 212 allows the data in the payload 210 to be efficiently mapped between Ethernet networks and the SONET/SDH networks used by the PSTN. The SONET/SDH transport overhead 212 is depicted as surrounding the Sync 206 because the Sync 206 may be inserted into undefined octets of the SONET/SDH transport overhead 212. A detailed description of the mapping of the H-TDM frames between the Ethernet format and the SONET/SDH format may be found in the aforementioned provisional patent applications.

The overlay synchronous timeslot scheme may allow the H-TDM frame to transport a variety of data types. When the synchronization window has a period of about 125 μs and each timeslot carries an octet of data, each of the timeslots in the overlay synchronous timeslot scheme represents a single channel with about 64 kilobits per second (Kbps) of bandwidth. These channels provide sufficient bandwidth to carry a voice conversation compatible with the PSTN. Thus, voice channels that are carried in an H-TDM frame may be referred to as TDM data.

The overlay synchronous timeslot scheme also provides octet-sized granularity that supports the communication of other traffic with stringent QoS requirements, referred to herein as HPF data. In an embodiment, the HPF data may require a deterministic amount of bandwidth. Examples of HPF traffic include video, audio, and other multimedia traffic. HPF traffic may be assigned multiple channels with single-octet granularity according to the bandwidth requirements of the HPF traffic. In other words, each channel assigned to a HPF increases the bandwidth allocated to the HPF by 64 Kbps. For example, a low resolution streaming video HPF requiring about 256 Kbps of bandwidth may be assigned about four channels from the H-TDM frame. Similarly, a HPF requiring about 3.2 megabits per second (Mbps) of bandwidth may be assigned about fifty channels from the H-TDM frame. In an embodiment, HPFs may be allocated bandwidth in 576 Kbps granularity to correspond to an entire column of a SONET/SDH frame.

In addition to being assigned to carry TDM and HPF data, the timeslots in the payload 210 may be assigned to carry BEP data. The BEP data may include low priority Ethernet packet data, data downloads, web browsing, or any other low priority data. In an embodiment, any timeslots in the payload 210 that are not assigned as TDM or HPF timeslots are automatically assigned as BEP timeslots. In another embodiment, at least a portion of the timeslots are assigned as BEP timeslots to ensure that at least some BEP data is contained in each H-TDM frame.

While the allocation of bandwidth may be performed as described above for constant bit rate (CBR) data streams, variable bit rate (VBR) data streams present an additional challenge. In an embodiment, VBR data streams may be allocated bandwidth according to a maximum amount of bandwidth that the VBR data streams may use. Consider a case wherein the VBR HPF may be a Motion Picture Experts Group (MPEG) encoded video data stream. The MPEG format may encode video data such that less bandwidth is needed to display scenes with few changes or movement, and more bandwidth is needed to display scenes with many changes or movement. In such a case, a HPF carrying the MPEG encoded video data may be allocated a sufficient quantity of timeslots to transport the maximum amount of bandwidth that the MPEG encoded video data stream will require. During scenes where less than the maximum amount of bandwidth is being used to communicate the MPEG encoded video data stream, the unused bandwidth may be reused by other data types, as described in detail below.

Figure 3:
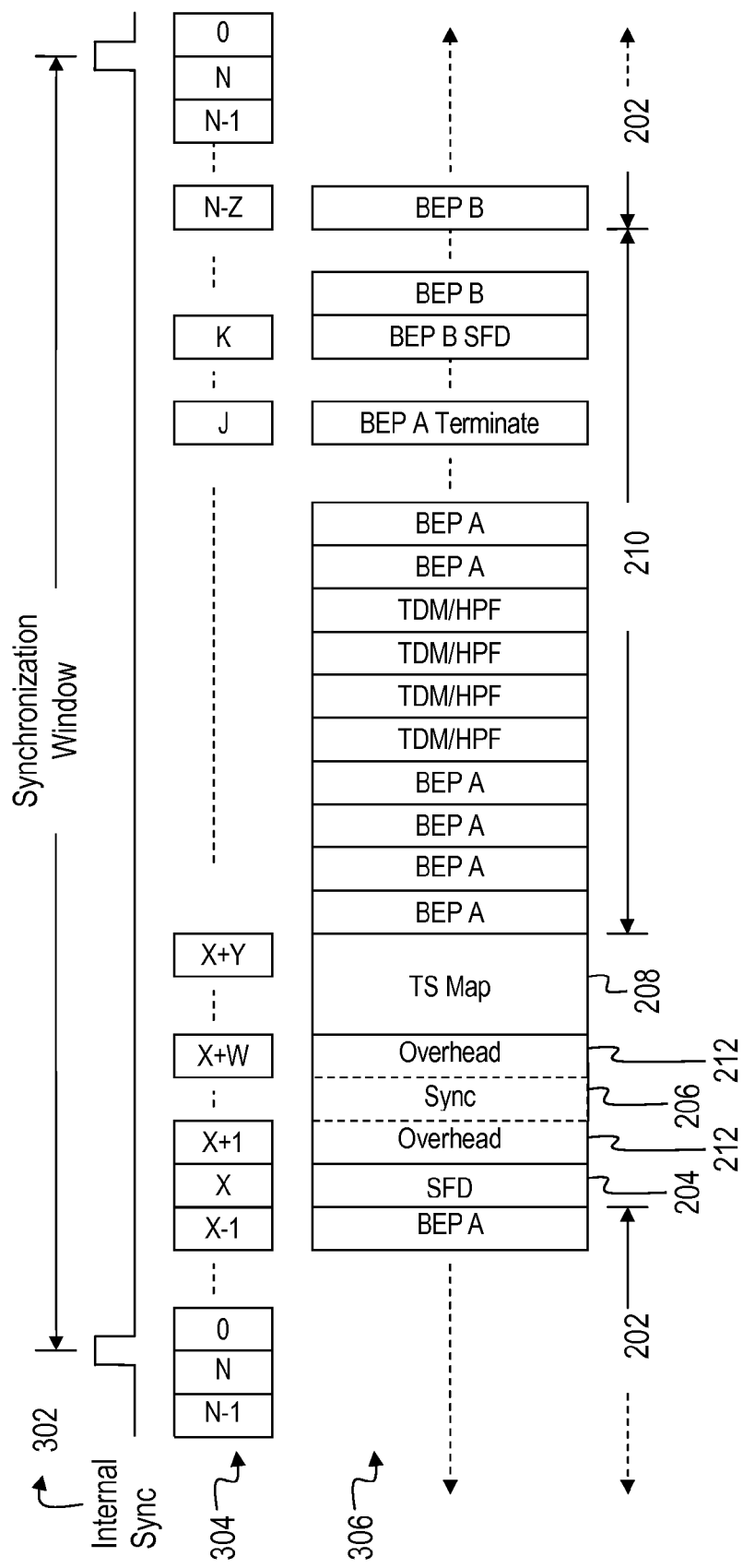
FIG. 3 is an illustration of an embodiment of a timeslot layout of the H-TDM frame.

FIG. 3 illustrates a more detailed layout of the overlay synchronous timeslot scheme from FIG. 2A. FIG. 3 contains three rows of information: an internal synchronization signal 302 that delineates the synchronization window, a timeline 304 that enumerates each timeslot, and a descriptor 306 that describes the data that may be contained within each timeslot. The internal synchronization signal 302 may correspond to the synchronization window established when initiating the Huawei Synchronized (H-Sync) or H-TDM operational modes, as described in U.S. patent application Ser. No. 11/735,590 entitled "Inter-Packet Gap Network Clock Synchronization."

The synchronization window may begin at timeslot 0. Timeslots 0 through X represent the guard intervals 202, and thus the descriptor 306 indicates that BEP traffic may be transported during these timeslots. Specifically, timeslot X−1 includes a first part of a first BEP, identified as BEP A. At timeslot X, BEP A may be interrupted by the SFD 204 that may delineate the start of the H-TDM frame. If the H-TDM frame includes SONET/SDH overhead 212, as shown in FIG. 2B, then the SONET/SDH overhead 212 and the Sync 206 are communicated subsequent to the SFD 202, e.g. in timeslots X+1 through X+W. In one embodiment, at least one idle octet or SONET/SDH transport overhead 212 octet may be inserted between timeslots X+1 and X+W. Such octets enable efficient mapping of the Sync 206 to an SONET/SDH frame, such that the Sync 206 aligns with the columns of the SONET/SDH frame. The TS Map 208 may follow timeslot X+W, and may indicate the type and location of the HPF, TDM, and/or BEP timeslots in the payload 210. The TS Map 208 may extend through timeslot X+Y.

The payload 210 of the H-TDM frame follows timeslot X+Y. The payload 210 may contain a second part of BEP A, which may be interrupted by one or more timeslots of TDM or HPF data. Upon the completion of the TDM or HPF timeslots, BEP A may continue until BEP A terminates at timeslot J. Following an IPG or immediately following the end of BEP A, a second BEP identified as BEP B may be initiated in timeslot K and the remaining timeslots. The H-TDM frame may end at timeslot N, however BEP B may continue into the guard interval 202, and perhaps into the guard interval 202 of the subsequent synchronization window. Thus, the transmission of a BEP does not necessarily end at the end of the H-TDM frame or at the end of the synchronization window, but instead when the BEP is complete or when interrupted by the subsequent SFD 204.

While the timeslot layout depicted in FIG. 3 communicates two BEPs, any amount of BEP data may be communicated within the synchronization window. For example, the synchronization window may contain no BEP data, part of a BEP, exactly one BEP, or multiple BEPs. Further, while FIG. 3 illustrates that the BEP data is interrupted only once due to a series of TDM and/or HPF timeslots, persons of ordinary skill in the art will appreciate that the BEP data may be interrupted any number of times by any number of TDM or HPF timeslots, or by timeslots assigned to a different instance of BEP data, as described below.

In an embodiment, the bandwidth of timeslots assigned to carry high priority data may be reused when a high priority timeslot is idle. Specifically, when timeslots assigned to HPF or TDM are not being used or are otherwise idle, the timeslots may carry low priority BEP data. As shown in FIG. 4, each timeslot assigned to carry high priority data, such as HPF, may be encoded such that a first bit is a control bit and the remaining bits carry data. The control bit may indicate whether the HPF timeslot is active or idle. For example, when the control bit has a "1" value, the HPF timeslot may be active and the data carried in the HPF timeslot may be HPF data. When the control bit has a "0" value, the HPF timeslot may be idle and the data bits may be reused to carry other data types such as BEP data. Unused or unassigned TDM timeslots can also be reused by the BEP data.

FIG. 5 illustrates an example of a flow of HPF data within three active HPF timeslots that use the encoding of FIG. 4. As shown in a first HPF timeslot, HPF timeslot 1, the control bit is set to "1" so as to indicate that the HPF timeslot 1 is active. If the HPF data is communicated in octet-sized sections, then the first seven bits of a first HPF octet are placed into the seven data bits of the HPF timeslot 1. In addition, a second HPF timeslot, HPF timeslot 2, similarly has the control bit set to "1" and the last bit of the first HPF octet and the first six bits of the next HPF octet are placed into the seven data bits of the HPF timeslot 2. Finally, a third HPF timeslot, HPF timeslot 3, has the control bit set to "1" and the last two bits of the second HPF octet and the first five bits of a third HPF octet are placed into the seven data bits of the HPF timeslot 3. Persons of ordinary skill in the art will appreciate that, while the HPF data is described as being divided into octet-sized sections, it is contemplated that the HPF data may be alternately configured and placed in the active HPF timeslots. For example, the HPF data may be communicated in seven bit increments such that each active timeslot fully communicates each seven bit increment.

FIG. 6 illustrates a data stream transported in three columns of a SONET/SDH frame that are assigned to carry HPF data. Each of columns X, X+1, and X+2 include data organized into eight bits, bit 0 through bit 7, and nine rows, row 1 through row 9. As persons of ordinary skill in the art will recognize, data is transported from the SONET/SDH frame on a row-by-row basis such that bits 0 through 7 of columns X, X+1, and X+2 are serially communicated for row 1, then row 2, and so forth. As such, data that is not completed in one column continues in the next column. For example, the first row of columns X and X+1 have the control bit set to "1" to indicate that they are active, and will carry the data indicated in the TS Map 208, e.g. HPF data. Column X+1 communicates an end of the HPF data, and thus bit 4 through bit 7 of column X+1 may be zero-padded or idle subsequent to the completion of the HPF data.

In contrast, column X+2 has the control bit set to "0" to indicate that the timeslot assigned to HPF data is idle, and thus bit 1 through bit 7 of column X+2 may be used to carry BEP data. Similarly, each of columns X, X+1, and X+2 are idle in rows 2 and 3, and column X is idle in row 4, and thus those areas may be used to carry BEP data. The BEP data may include the start of a new BEP, the end of a BEP, or idle data between BEPs. Further, the BEP data carried in the idle HPF timeslots may include BEP data that is located elsewhere in the overlay synchronous timeslot scheme. For example, the BEP data may include data from a previous BEP, such as a BEP that was located in a guard band or in the payload prior to the HPF timeslots.

As shown in row 4 of column X+1, a new HPF is started, and the remaining rows may be active and contain the new HPF. The new HPF data does not wait for the BEP to be completed, but instead interrupts the BEP as soon as the HPF is received. In this way, bandwidth assigned to carry high priority data in HPF timeslots may be dynamically reused by the BEP without any delay to the HPF data.

Figures 7, 8A, 8B:
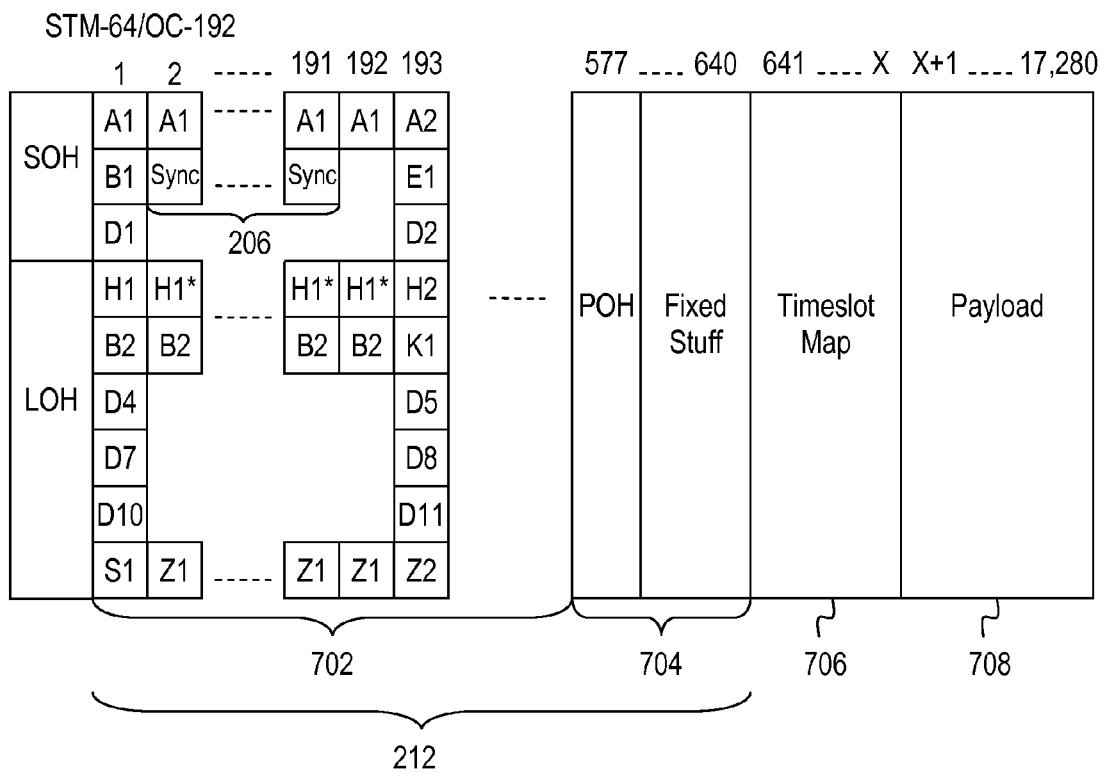
FIG. 7 is an illustration of an embodiment of the H-TDM frame in an STM-64/OC-192 frame.
FIG. 8A is an illustration of an embodiment of the timeslot map.
FIG. 8B is an illustration of another embodiment of the timeslot map.

FIG. 7 illustrates a layout of the overlay synchronous timeslot scheme within a SDH/SONET STM-67/OC-192 frame. The STM-67/OC-192 frame includes 576 columns of transport overhead 702 organized into three rows of section overhead (SOH) and six rows of line overhead (LOH). The STM-67/OC-192 frame also includes 64 columns of a path overhead (POH) and fixed stuff 704, and 16,640 columns of a STM-67/OC-192 frame payload. The transport overhead 702, POH, and fixed stuff 704 collectively constitute the SONET/SDH overhead 212 described above. The TS Map 208 and the payload 210 may be arranged in the STM-67/OC-192 frame payload such that the TS Map 208 is aligned with column 671 through column X in a first area 706 of the STM-67/OC-192 frame payload, and the payload 210 is aligned with column X+1 through column 17,280 in a second area 708 of the STM-67/OC-192 frame payload.

In an embodiment, the Sync 206 may be included within the transport overhead 702. Specifically, the Sync 206 may be located within a plurality of undefined octets in the second row in the transport overhead 702. While the Sync 206 is shown located in particular undefined octets, e.g. anywhere in columns 2 through 191 of the second row, persons of ordinary skill in the art will appreciate that the Sync 206 may be communicated in any other undefined octets of the transport overhead 702. Alternatively, the Sync 206 may be communicated in the first two columns of the STM-67/OC-192 frame payload, e.g. columns X+1 and X+2. In such an embodiment, the first half of the Sync 206 may be located in the first column, and the second half of the Sync 206 may be located in the second column.

FIG. 8A illustrates an embodiment of the TS Map 208. The TS Map 208 may be comprised of a pattern of bits, wherein the value of each bit indicates whether a timeslot is assigned to carry high priority data or low priority data. Specifically, timeslots assigned to low priority data may carry BEP data and timeslots assigned to carry high priority data may carry HPF or TDM data. A bit in the TS Map 208 with a "0" value may mean that a particular timeslot is assigned to carry low priority data. Similarly, a bit in the TS Map 208 with a "1" value corresponds with a timeslot being assigned to carry high priority data. Moreover, the relative locations of bits in the TS Map 208 correspond with the relative locations of timeslots in the payload 210. For example, the first bit in the TS Map 208 corresponds with the first timeslot in the payload 210, and the last bit in the TS Map 208 corresponds with the last timeslot in the payload 210. Thus, if the TS Map 208 includes a pattern of bits with the values "00110," then the first and second timeslots would be assigned to carry low priority data, the third and fourth timeslots would be assigned to carry high priority data, and the fifth timeslot would be assigned to carry low priority data.

FIG. 8B illustrates another embodiment of the TS Map 208. Similar to the embodiment of FIG. 8A, the TS Map 208 may be comprised of a pattern of bits. However, in this embodiment each pair of bits indicates the assignment of a timeslot to carry BEP, HPF, or TDM data. A pair of bits with a "00" value corresponds with a timeslot being assigned to carry BEP data. A pair of bits with a "01" value corresponds with a timeslot being assigned to carry TDM data. A pair of bits with a "10" value corresponds with a timeslot being assigned to carry HPF data. The value "11" is an undefined data type in this embodiment and may be reserved for other data types. As before, the relative locations of the pairs of bits in the TS Map 208 correspond with the relative locations of timeslots in the payload. For example, the first pair of bits in the TS Map 208 corresponds with the first timeslot in the payload 210, and the last pair of bits in the TS Map 208 corresponds with the last timeslot in the payload 210. Thus, if the TS Map 208 includes a pattern of bits with the values "00 10 01 00," then the first timeslot is assigned to carry BEP data, the second timeslot is assigned to carry HPF data, the third timeslot is assigned to carry TDM data, and the fourth timeslot is assigned to carry BEP data.

While particular values are described as being associated with one of the three traffic types, persons of ordinary skill in the art will recognize other pairings of value and traffic type are possible. For example, the TS Map 208 may use the value "01" to designate BEP traffic and the value "00" to designate TDM traffic. Further, while the TS Map 208 in this embodiment assigns each timeslot as being a timeslot for carrying one of BEP, HPF, or TDM data, in other embodiments other designations may be used. For example, the traffic type designation may correspond with different QoS levels. In this case, timeslots may be designated as carrying traffic for voice data, video data, best-effort data, or background data. Still further, while one or two bits may be used to indicate the assignment of a traffic type to each timeslot in the payload 210, more bits may be used in the TS Map 208. For example, if three bits were used for the TS Map 208 then a greater number of traffic types may be indicated. In particular, with three bits, eight traffic types may be differentiated within the TS Map 208.

Figure 9:
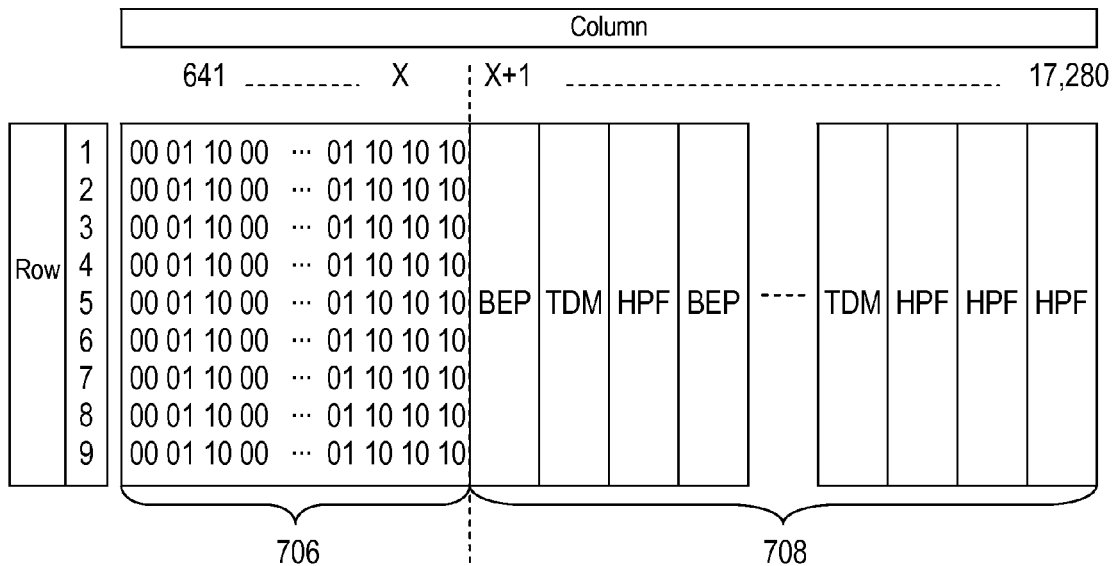
FIG. 9 is an illustration of an embodiment of the timeslot map and payload in the STM-64/OC-192 frame.

FIG. 9 illustrates an embodiment where the data types in the payload are aligned into columns. Specifically, the TS Map 208 may be organized within the first area 706 such that each column of the payload 708 is assigned to carry one of HPF, TDM, or BEP data. When each column of the payload 708 carries one of the data types, each of the rows of the TS Map 208 in the first area 706 are identical. That is, the TS Map 208 is essentially a bit pattern that indicates the assignment of each column of the payload 708, and that is replicated for each of the nine rows of the STM-67/OC-192 frame. In such an embodiment, eight rows of the TS Map 208 may be omitted, and the single remaining row of the TS MAP 208 may be used to determine the data types assigned to the timeslots for all nine rows. However, persons of ordinary skill in the art will appreciate that while each column may be assigned to carry one of the data types, the content of the data carried in each row may differ from the assignment, for example, due to the aforementioned bandwidth reuse and/or prioritization within data types.

Each entry in the STM-64/OC-192 frame may contain an octet of data, where an entry is defined as the intersection of a column and a row. As such, each entry in the TS Map 706 provides the data type assignment for four columns in the payload 708 when the TS Map 208 format shown in FIG. 8B is used. As shown in FIG. 9, column 641 may contain a TS Map 208 with the bit pattern "00 01 10 00," and column X may contain a TS Map 208 with the bit pattern "01 10 10 10." Thus, the bit pattern in column 641 indicates that the first column of the payload 708, column X+1, is assigned to carry BEP data, column X+2 is assigned to carry TDM data, column X+3 is assigned to carry HPF data, and column X+4 is assigned to carry BEP data. Similarly, the bit pattern in column X indicates that column 17,277 of the payload 708 is assigned to carry TDM data, and columns 17,278 through 17,280 are assigned to carry HPF data.

The STM-64/OC-192 frame may be serially transported over a SONET/SDH interface on a row-by-row basis. Specifically, the first row of columns 1 through 17,280 may be transported prior to transporting the second row of columns 1 through 17,280. As such, the serial data stream transporting the STM-64/OC-192 frame includes nine sections, where each section contains portions of the transport overhead 212, the TS Map 704, and the payload 708. In contrast, the transport overhead 212, TS Map 208, and payload 210 are generally communicated in distinct sections over an Ethernet interface, as depicted in FIGS. 2A and 2B. That is, each of the transport overhead 212, TS Map 208, and payload 210 of the H-TDM frame may be communicated in their entirety over the Ethernet interface prior to communicating the next section. As such, when communicating the H-TDM frame over an Ethernet interface and subsequently communicating the H-TDM frame over a SONET/SDH interface, each section of the Ethernet frame may need to be mapped onto a corresponding set of columns in a SONET/SDH frame. The reverse may be true when converting the H-TDM frame from a SONET/SDH format to an Ethernet format.

Figure 10A:
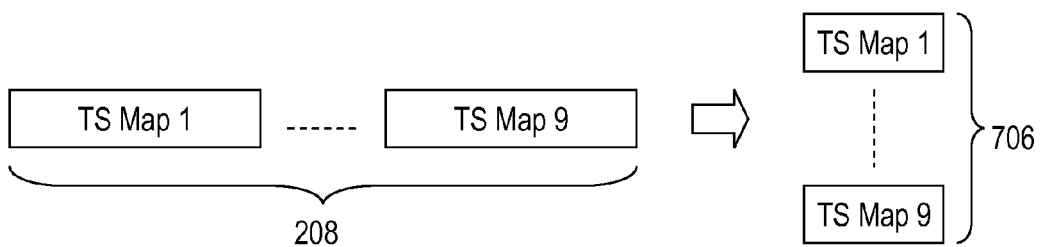
FIG. 10A is an illustration of an embodiment of the process of communicating the timeslot map over an Ethernet interface and a SONET/SDH interface.

As shown in FIG. 10A, when the TS Map 208 is transported over an Ethernet interface, the TS Map 208 may be visualized as nine identical sections that are communicated in series. To map the TS Map 208 to a SONET/SDH frame, the TS Map 208 may be buffered and distributed to each row of the SONET/SDH frame on a section-by-section basis. Similar processing may occur for the transport overhead 212 and payload 210 sections of the H-TDM frame.

Figure 10B:
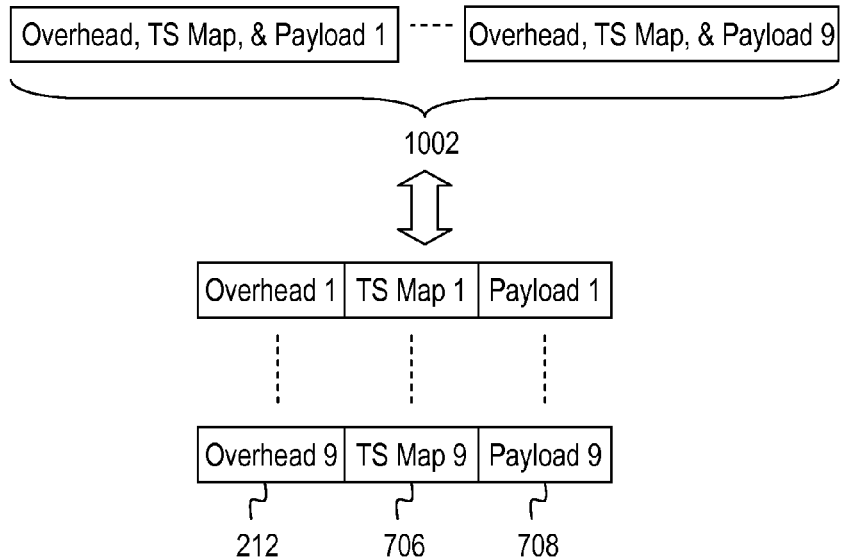
FIG. 10B is an illustration of another embodiment of the process of communicating the H-TDM frame over an Ethernet interface and a SONET/SDH interface.

FIG. 10B illustrates an alternative arrangement for the H-TDM frame. Specifically, the H-TDM frame may be organized such that the transport overhead 212, the TS Map 208, and the payload 210 are arranged in nine consecutive sections 1002 with each section including a portion of the transport overhead 212, the TS Map 208, and the payload 210. By organizing the H-TDM frame in this way, the content of the H-TDM frame may be transported identically over Ethernet interfaces and over SONET/SDH interfaces. While the above describes one of the difficulties of transporting the H-TDM frame over SONET/SDH interfaces and Ethernet interfaces, many other factors and provisions may be considered. The aforementioned provisional patent applications provide a detailed description of the process of mapping the H-TDM frame between Ethernet and SONET/SDH interfaces.

Figure 11:
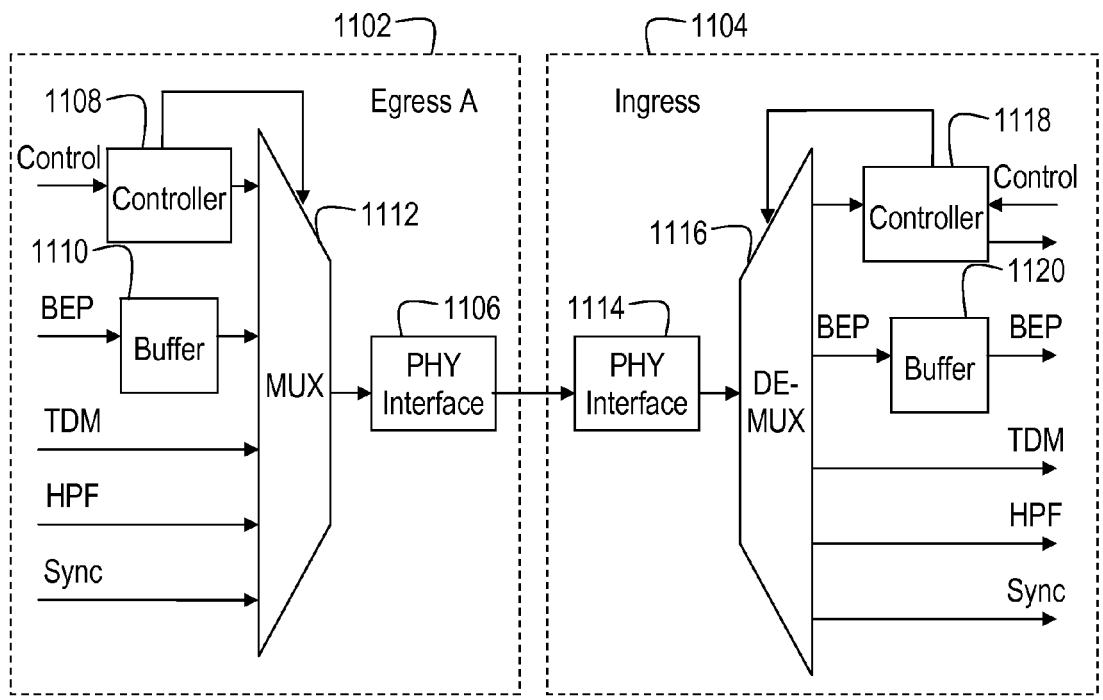
FIG. 11 is an illustration of an embodiment of a functional block diagram of the egress port and ingress port of two nodes.

FIG. 11 depicts an example of a functional block diagram of the egress and ingress ports of two nodes. An egress port 1102 of a node A is in communication with an ingress port 1104 of a node B, and transports the H-TDM overlay synchronous timeslot scheme over physical layer (PHY) interfaces. The egress port 1102 is configured to receive BEP, HPF, and TDM data as well as synchronization data, e.g. the Sync 206, and control data. The control data includes the transport overhead 212, the TS Map 208, and any additional control data, such as the SFD 204, required to transport the H-TDM overlay synchronous timeslot scheme over an egress PHY interface 1106. A controller 1108 uses the control data to multiplex the various data streams, as described below. A buffer 1110 may store the BEP data until the BEP data is needed by an egress multiplexer 1112. The egress multiplexer 1112 multiplexes the data from the controller 1108 and the buffer 1110 with the HPF data, the TDM data, and the synchronization data. Specifically, the egress multiplexer 1112 selects data from one of the inputs for each octet within the synchronization window. Upon selecting an input, the egress multiplexer 1112 communicates the data received on the selected input to the egress PHY interface 1106 for transport over a communication medium.

The controller 1108 instructs the egress multiplexer 1112 to select each of the inputs according to the TS Map 208. For example, within the guard intervals 202 of the H-TDM overlay synchronous timeslot scheme, the controller 1108 instructs the egress multiplexer 1112 to select BEP data from the buffer 1110. Upon receiving the SFD 204, the controller 1108 instructs the egress multiplexer 1112 to accept a portion of the transport overhead 212 from the controller 1108, and then accept the Sync 206 from the synchronization input. Upon completion of the Sync 206, the controller 1108 instructs the egress multiplexer 1112 to accept the remainder of the transport overhead 212 and the TS Map 208 from the controller 1108. Upon completion of the transport overhead 212 and the TS Map 208, the controller instructs the egress multiplexer 1112 to accept the TDM data, the HPF data, and the BEP data according to the TS Map 208. Finally, upon completion of the payload 210, the controller 1108 instructs the egress multiplexer 1112 to accept the BEP data from the buffer 1110, e.g. for transport during the guard interval 202.

The ingress port 1104 of node B is configured to receive the data transported over the communication medium on an ingress PHY interface 1114. The ingress PHY interface 1114 forwards the data to an ingress demultiplexer 1116, which demultiplexes the data stream. The ingress demultiplexer 1116 also forwards the data to a controller 1118, a buffer 1120, a TDM data output, an HPF data output, or a synchronization output as instructed by the controller 1118. The buffer 1120 may be configured to store the BEP data received from the ingress demultiplexer 1116. The controller 1118 may control the ingress demultiplexer 1116 using control information received from the ingress demultiplexer 1116 and/or from other components in node B. As part of the control, the controller 1118 uses the TS Map 208 received over the ingress PHY interface 1114 to control the demultiplexing of the data stream.

Similar to the controller 1108, the controller 1118 instructs the ingress demultiplexer 1116 to forward the received data to the outputs according to the TS Map 208. For example, within the guard intervals 202 of the H-TDM overlay synchronous timeslot scheme, the controller 1118 instructs the ingress demultiplexer 1116 to send the received BEP data to the buffer 1120. When the SFD 204 is received, the controller 1118 instructs the ingress demultiplexer 1116 to send the received data to the controller 1118. In an alternative embodiment, the ingress demultiplexer 1116 may contain logic that recognizes the SFD 204 such that the received data is sent to the controller 1118 without any instructions from the controller 1118. If the data received after the SFD 204 includes a portion of the transport overhead 212, the ingress demultiplexer 1116 sends such data to the controller 118. The ingress demultiplexer 1116 then sends the Sync 206 to the synchronization output. Subsequent to the Sync 206, the ingress demultiplexer 1116 may send the remainder of the transport overhead 212 and the TS Map 208 to the controller 1118. The controller 1118 may then use the received TS Map 208 to instruct the ingress demultiplexer 1116 to distribute the received data to the TDM data output, the HPF data output, and the buffer 1120. Finally, upon completion of the payload 210, the controller 1118 again instructs the ingress demultiplexer 1116 to send the BEP data received during the guard interval 202 to the buffer 1120.

The egress port 1102 and the ingress port 1104 may each be implemented as part of a communication interface between two nodes. In an embodiment, the egress port 1102 and the ingress port 1104 may each be implemented as part of a line card that supports core network communications. Further, while only the egress port 1102 of node A and the ingress port 1104 of node B are shown, full-duplex communications may be supported by each of nodes A and B including an ingress port on node A and an egress port on node B. In such a case, in addition to the egress port 1102 of node A and the ingress port 1104 of node B communicating with each other, an egress port of node B and an ingress port of node A may also communicate with each other.

Figure 12:
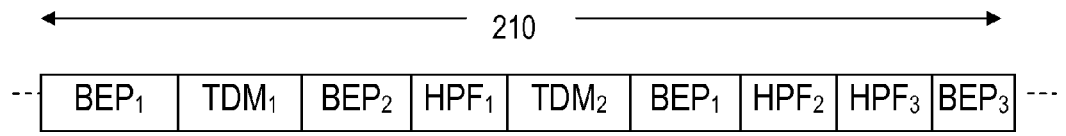
FIG. 12 is an illustration of an embodiment of a payload with multiple instances of each traffic type.

While the payload 210 described above only contains one instance of each traffic type, the payload 210 may also contain multiple instances of each traffic type, as shown in FIG. 12. Specifically, FIG. 12 illustrates part of a payload 210 that includes a plurality of instances of BEP data, a plurality of instances of TDM data, and a plurality of instances of HPF data. Moreover, while each instance may be a complete set of data, it is envisioned that each instance may not be completed before proceeding to another instance. For example, FIG. 12 illustrates three instances of BEP data, $BEP_1$, $BEP_2$, and $BEP_3$, which may represent data from three separate Ethernet payloads. $BEP_1$ may not necessarily be completed before the start of $TDM_1$. Likewise, $BEP_2$ may follow $TDM_1$ even though $BEP_1$ may not be complete. Thus, the timeslots following FIG. 12 may contain the completion of $BEP_1$, $BEP_2$, and $BEP_3$.

Figure 13:
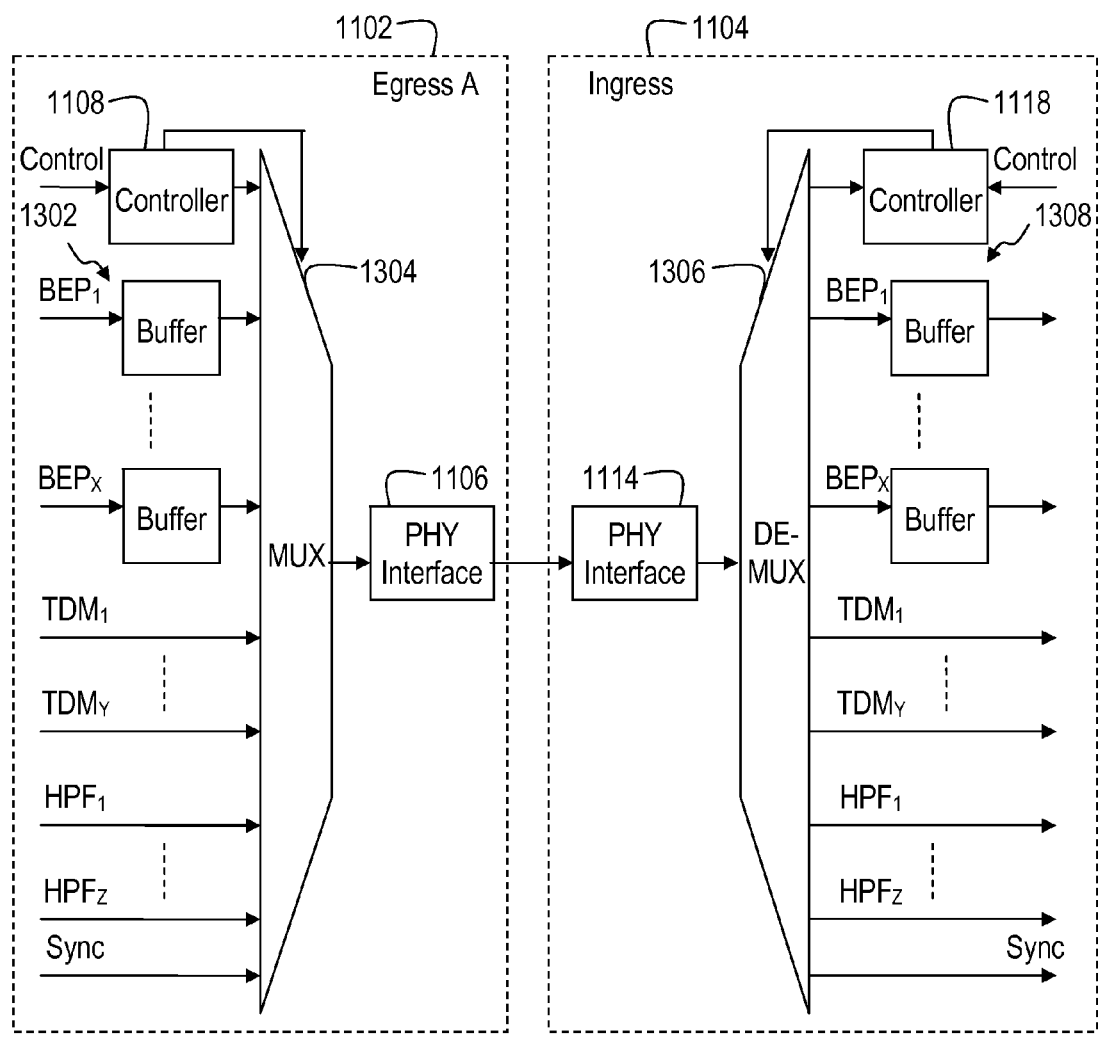
FIG. 13 is an illustration of another embodiment of a functional block diagram of the egress port and ingress port of two nodes.

FIG. 13 depicts a modification of the functional block diagram of FIG. 11. Specifically, FIG. 11 illustrates modified egress and ingress ports that transport multiple instances of each data type in the H-TDM overlay synchronous timeslot scheme over PHY interfaces. As shown in FIG. 13, the egress port 1102 of node A includes the egress PHY interface 1106 and the controller 1108 as described above. The egress port 1102 has been modified such that multiple instances of BEP, HPF, and TDM data may be received. For example, the BEP data may include instances $BEP_1$ through $BEP_X$, the TDM data may include instances $TDM_1$ through $TDM_Y$, and the HPF data may include instances $HPF_1$ through $HPF_Z$. These various instances may be multiplexed as described above.

As shown in FIG. 13, each instance of BEP data may be input to one of a plurality of buffers 1302. While each of the instances of BEP data are show as being input into separate buffers 1302, it is contemplated that the buffers 1302 may be implemented as a single memory with each instance of BEP data permitted to write data to different address ranges of the memory, or otherwise logically divide the memory to provide the buffers 1302. The buffer outputs, the other data instances, the control data, and the synchronization data are fed to an egress multiplexer 1304, which multiplexes the various inputs according to the TS Map 208. In this embodiment, the TS Map 208 may be modified from the embodiment shown in FIG. 8B to include more bits such that each data type may include multiple instances. For example, with three bits for each timeslot in the payload 210, there may be up to four instances of BEP data, two instances of TDM data, and two instances of HPF data in the TS Map 208.

The ingress port 1104 of node B includes the ingress PHY interface 1114 and the controller 1118 as described above. The ingress port 1104 has been modified to include an ingress demultiplexer 1306 that forwards the demultiplexed data to the various outputs according to the TS Map 208. The ingress port 1104 has further been modified to include a plurality of output buffers 1308 that may be implemented similar to the buffers 1302 as described above.

When the egress and ingress ports contain multiple instances of a data type, the instances within the data type may be prioritized such that the individual instances are treated differently. For example, if there are two BEP instances, $BEP_1$ and $BEP_2$, then $BEP_1$ may be prioritized over $BEP_2$ such that all of the $BEP_1$ data is transported, e.g. in the guard bands, the BEP timeslots, and the idle HPF timeslots, before any of the $BEP_2$ data is transported. Alternatively, a policy may be created that favors $BEP_1$ data over $BEP_2$ data in transport selection, but allows some $BEP_2$ data to be transported in each frame even if not all of the $BEP_1$ data has been transported. Similar priorities and policies may also be created for the TDM and HPF data, if desired.

While the H-TDM overlay synchronous timeslot scheme enables the communication of both TDM data and BEP data over Ethernet communication interfaces, the H-TDM overlay synchronous timeslot scheme may not be backwards compatible with some Ethernet nodes at the media access control (MAC) layer, or OSI Layer 2. In such a case, a Huawei jumbo (H-JUMBO) operational mode may partition the H-TDM overlay synchronous timeslot scheme into a plurality of sections and encapsulate each section with Ethernet Layer 2 framing. By doing so, the H-JUMBO operational mode enables the transport of H-TDM payloads through Ethernet nodes that do not support the H-TDM overlay synchronous timeslot scheme.

Figure 14:
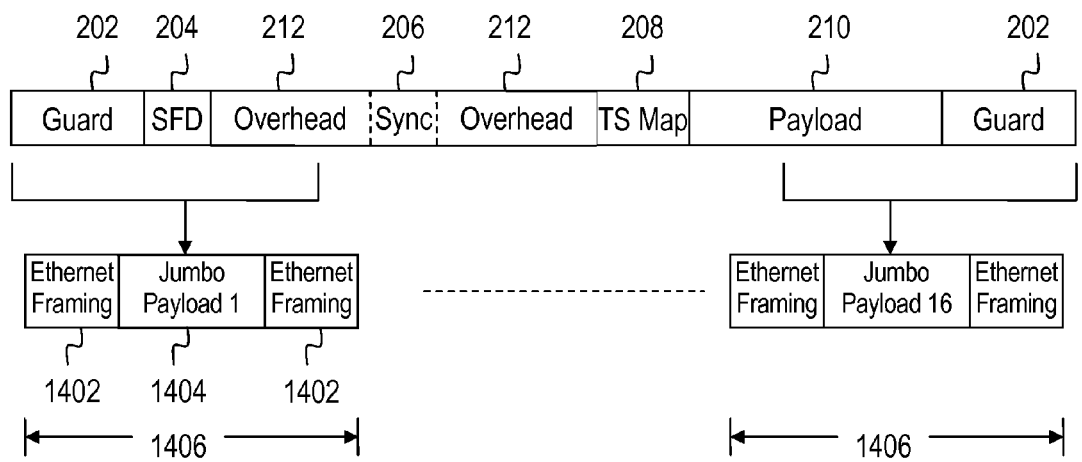
FIG. 14 is an illustration of an embodiment of the process of encapsulating the H-TDM frame within a plurality of Ethernet packets.

FIG. 14 illustrates an example of the H-TDM overlay synchronous timeslot scheme partitioned using the H-JUMBO operational mode. As described above, the H-JUMBO operational mode partitions the overlay synchronous timeslot scheme into sections that are encapsulated into Ethernet frames. The sections may not necessarily correspond to any particular content within the overlay synchronous timeslot scheme, but rather may be selected based on the quantity of the octets. Although the sections may contain any amount of data, in specific embodiments the sections may contain from about 42 octets to about 1,500 octets in standard packets, and may contain more than 1,500 octets, e.g. from about 9,000 octets to about 12,000 octets, in jumbo packets. In a specific embodiment, jumbo Ethernet frames with a payload of about 9,600 octets are used in the H-JUMBO operational mode.

As shown in FIG. 14, each partition of the H-TDM overlay synchronous timeslot scheme may be inserted into a jumbo payload 1404 that may be encapsulated within Ethernet Layer 2 framing 1402. The Ethernet Layer 2 framing 1402 enables the transport of a jumbo Ethernet frame 1406 with a portion of the H-TDM overlay synchronous timeslot scheme across one or more standard Ethernet nodes. With the payload of about 9,600 octets for each of the jumbo Ethernet frames 506, the H-TDM overlay synchronous timeslot scheme may be encapsulated within about sixteen jumbo Ethernet frames 1406. The H-JUMBO operational mode enables the transparent transport of H-TDM payloads through Ethernet networks that do not support the H-TDM operational mode. In an embodiment, optional VIDs and/or TPIDs may be included in the jumbo Ethernet frames 1406 to assist in re-ordering the received packets. In another embodiment, the jumbo Ethernet frames 506 may be transported in series to ensure proper ordering.

Figure 15:
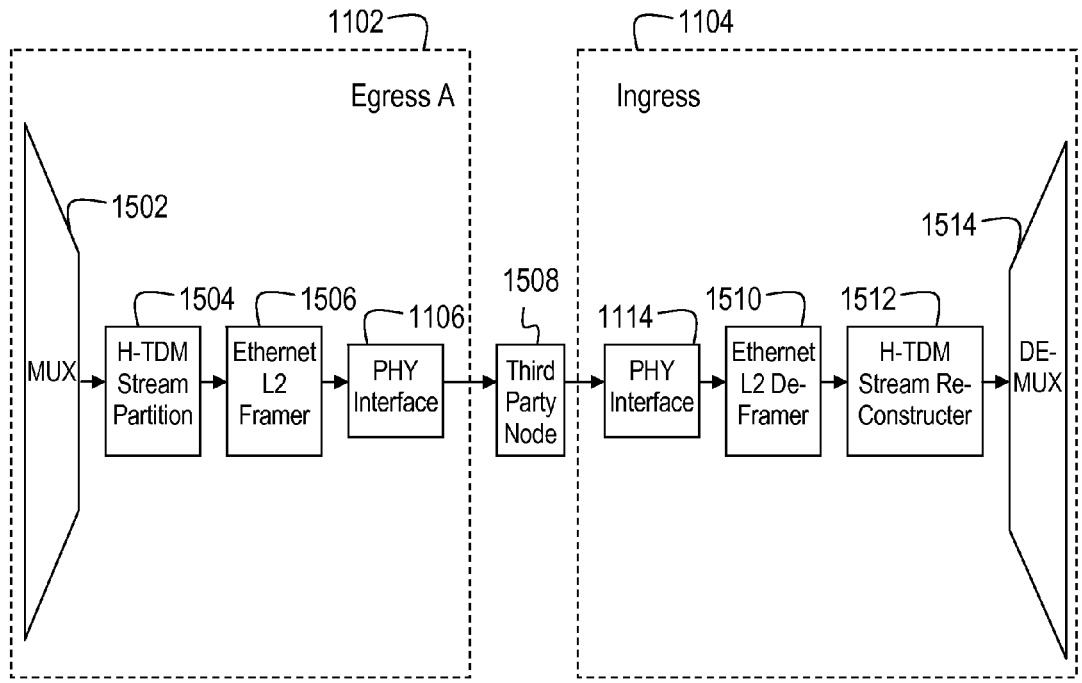
FIG. 15 is an illustration of another embodiment of a functional block diagram of the egress port and ingress port of two nodes.

FIG. 15 depicts another modification of the functional block diagram of FIG. 11. Specifically, FIG. 15 illustrates modified egress and ingress ports that transport the H-TDM overlay synchronous timeslot scheme according to the H-JUMBO operational mode. The egress port 1102 of node A includes the egress PHY interface 1106 and a multiplexer 1502, which is similar to the multiplexer 1112 and multiplexer 1304 described above. However, the egress port 1102 has been modified such that the H-TDM overlay synchronous timeslot scheme may be partitioned by an H-TDM stream partition 1504. Each of the partitions may be output from the H-TDM stream partition 1504 to an Ethernet Layer 2 framer 1506. The Ethernet Layer 2 framer 1506 encapsulates each partition into an Ethernet MAC frame. The Ethernet Layer 2 framer 1506 outputs an Ethernet Layer 2 compatible data stream. The Ethernet Layer 2 compatible data stream may be transported via the PHY interface 1106 through at least one third-party Ethernet node 1508, which may be a switch, router, or bridge. The third-party Ethernet node 1508 may then communicate the Ethernet Layer 2 compatible data stream to the Ethernet PHY interface 1114 on ingress port 1104.

At node B, the ingress port 1104 includes the egress PHY interface 1114 and a demultiplexer 1514, which may be similar to the demultiplexer 1116 and the demultiplexer 1306 described above. However, the ingress port 1104 has been modified such that the received Ethernet Layer 2 compatible data stream may be input to an Ethernet Layer 2 de-framer 1510 to extract each partition of the H-TDM overlay synchronous timeslot scheme. The extracted partitions of the H-TDM overlay synchronous timeslot scheme may then be input to an H-TDM stream re-constructor 1512 that reconstructs the H-TDM overlay synchronous timeslot scheme. The reconstructed H-TDM overlay synchronous timeslot scheme may then be input to the demultiplexer 1512 and processed as described above.

Figure 16:
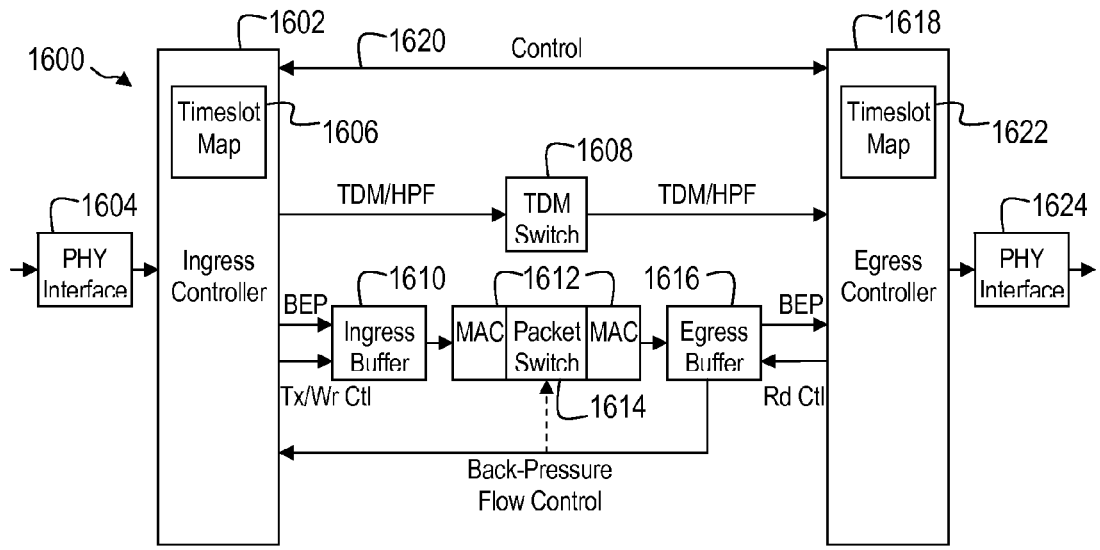
FIG. 16 is an illustration of another embodiment of a functional block diagram for communicating the H-TDM frame within a node.

FIGS. 11, 13, and 15 describe how the H-TDM overlay synchronous timeslot scheme may be communicated between nodes over physical layer interfaces. In contrast, FIG. 16 is a functional block diagram of some of the internal components of a node 1600. Specifically, FIG. 16 illustrates a reconciliation sub-layer between existing PHY and MAC layers that transports the H-TDM overlay synchronous timeslot scheme through the node 1600. Such an embodiment may use standard TDM and packet switching, and may not modify the existing PHY and MAC components. Persons of ordinary skill in the art will appreciate that while FIG. 16 illustrates a node with one ingress port and one egress port, the node 1600 may have a plurality of egress ports and a plurality of ingress ports, and that the switching fabric may route the various data types between the ingress and egress ports.

As shown in FIG. 16, an ingress controller 1602 may receive a data stream over a PHY interface 1604 and separate the HPF and TDM traffic from the BEP packet traffic. The ingress controller 1602 may include one of the ingress demultiplexers 1306 or 1116 and other circuits or logic that enable the ingress controller 1602 to communicate the H-TDM overlay synchronous timeslot scheme across the node 1600. The ingress controller 1602 may maintain a copy of the TS Map 208 in a memory 1606, such as on the controller 1118 described above. The ingress controller 1602 may send the TDM and HPF data directly to a TDM switch 1608 that routes the data to the various egress ports. In contrast, the BEP data may be sent to an ingress buffer 1610, which may be similar to the buffer 1120 and the buffers 1308 described above.

The ingress controller 1602 may instruct the ingress buffer 1610 to store BEP data that is received from the ingress controller 1602 in the ingress buffer 1610. The ingress controller 1602 may also instruct the ingress buffer 1610 to send data from the ingress buffer 1610 to the MAC logic 1612. The ingress buffer 1610 may operate as a first-in-first-out (FIFO) memory such that BEP data is switched across the node 1600 in the order that it is received. The ingress buffer 1610 may buffer the BEP traffic en route to a packet switch 1614 while smoothing out and hiding interruptions and delays caused by the multiplexing of multiple data types in the H-TDM overlay synchronous timeslot scheme. In an embodiment, the ingress buffer 1610 may buffer the BEP data at least until an entire packet has been received. In another embodiment, BEP data stored in the ingress buffer may begin being switched prior to receiving a complete packet. For cut-through BEP traffic, ingress packet delay due to the ingress buffer 1610 may be minimized if the length of the packet is known because the number of interrupting timeslots is always deterministic. In addition, the ingress buffer can support cut-through traffic by calculating the minimum amount of time that it has to buffer a packet before it can start transmitting the packet to a packet switch 1614 because the number of timeslots in use is known to the ingress controller due to the storage of the TS Map 208 in memory 1606. Such an embodiment eliminates the possibility of needing data before it is available, a condition known as under-run.

The MAC logic 1612 provides the BEP data to the packet switch 1614 such that the BEP data may be switched across the node 1600. In embodiments, the MAC logic 1612 may be implemented as Ethernet MAC logic or any other logic known to persons of ordinary skill in the art. After being switched by the packet switch 1614, the BEP data is provided to a second MAC logic 1612, and subsequently stored in an egress buffer 1616. The egress buffer 1616 may buffer the BEP packet data to smooth out the delays in the packet traffic caused by the insertion of HPF and TDM traffic in the egress data stream. While the TDM switch 1608 and the packet switch 1614 are illustrated as separate switching fabrics, they may be combined into a unified switching fabric. Several architectures for providing ingress and egress controllers that communicate over a unified switching fabric are detailed in the aforementioned provisional applications.

For HPFs that are high priority packet data, the HPF may be communicated to the packet switch 1614 for transport across the node 1600. In this case, the high priority packet data may be sent directly to the first MAC logic 1612, through the packet switch 1614 and output from the second MAC logic 1612 without being buffered in the ingress buffer 1610 or the egress buffer 1616. In an alternative embodiment, the high priority packet data may be provided to a separate ingress and egress buffer that are used exclusively for providing high priority packet data to and from the packet switch 1614. Further in the alternative, high priority packets may have their own switch fabric and may not be routed through any buffers.

In another embodiment, all HPF data is switched using the TDM switch 1608 regardless of whether the data is high priority packet data. Using these embodiments, the high priority packet data may be switched with greater expedience than the lower priority BEP data.

The egress controller 1618 may receive control information, such as the TS Map 208 and the Sync 206, from the ingress controller 1602 via a control channel 1620. Specifically, the egress controller 1618 maintains a copy of the TS Map 208 in a memory 1622 such that the egress controller 1618 knows how to multiplex TDM, HPF, and BEP traffic with the TS Map 208 and the Sync 206. The egress controller 1618 also provides control data to the egress buffer 1616 such that BEP data may be removed from the egress buffer 1616 as needed according to the TS Map 208 stored in the memory 1622. Similarly, the egress controller 1618 receives TDM and HPF data from the TDM switch 1608, and forwards the TDM and HPF data to the egress data stream according to the TS Map 208 stored in the memory 1622. Upon receiving the various traffic types from the TDM switch 1608 and the egress buffer 1616, an egress controller 1618 multiplexes the traffic with control and timing information, such as the TS Map 208 and the Sync 206, and transmits the multiplexed data via a PHY interface 1624. The egress controller 1618 may include one of the egress multiplexer 1112 or 1304 and other circuits or logic that enable the egress controller 1618 to send the H-TDM overlay synchronous timeslot scheme over the PHY interface 1624.

The egress controller 1618 may also provide back-pressure flow control to the egress buffer 1616, thereby controlling the traffic flow from the packet switch 1614 to the egress buffer 1616. The back-pressure flow control provides a mechanism through which the flow of BEP data may be adjusted without affecting the flow of TDM and HPF data. In one embodiment, the egress buffer 1616 may supply the back-pressure flow control to the ingress controller 1602. The ingress controller 1602 may then provide instructions to the ingress buffer 1610 to vary the flow of BEP data sent to the packet switch 1614. In an alternative embodiment, the back-pressure flow control may be supplied directly to the packet switch 1614, as shown by the dashed line, thereby controlling traffic flow at the packet switch 1614. Regardless of the specific implementation, the back-pressure flow control may conform to IEEE 802.3x, which is incorporated by reference as if reproduced in its entirety.

The egress controller 1618 may supply back-pressure flow control to either increase or decrease the traffic flow. For example, when the BEP data in the egress buffer 1616 reaches an upper capacity threshold, the egress controller 1618 may provide back-pressure flow control to decrease traffic flow from the packet switch 1614 such that data in the egress buffer 1616 does not get overwritten. Similarly, when the BEP data in the egress buffer 1616 reaches a lower capacity threshold, the egress controller 1618 may provide back-pressure flow control to increase traffic flow from the packet switch 1614 such that the egress buffer 1616 may maintain a minimum amount of BEP data.

When the ingress controller 1602 receives the back-pressure flow control, the ingress controller may provide instructions to the ingress buffer 1610 to increase or decrease an amount of BEP data that is sent to the packet switch 1614. For example, if the back-pressure flow control requests a reduction in traffic flow from the packet switch 1614, then the ingress controller 1602 may instruct the ingress buffer 1610 to decrease the amount of BEP data sent to the packet switch 1614. In some situations, the ingress controller may instruct the ingress buffer 1610 to stop all BEP data from being sent to the packet switch 1614. Similarly, if the back-pressure flow control requests an increase in traffic flow from the packet switch 1614, then the ingress controller 1602 may instruct the ingress buffer 1610 to increase the amount of BEP data sent to the packet switch 1614.

Figure 17:
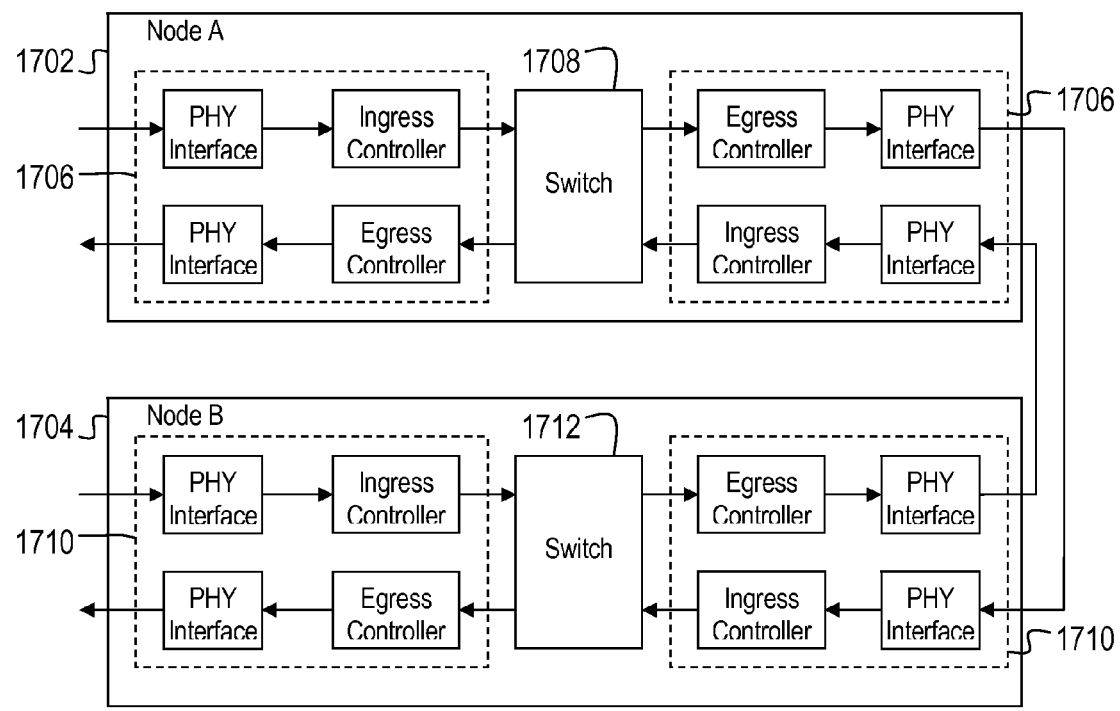
FIG. 17 is an illustration of an embodiment of two nodes.

FIG. 17 illustrates two nodes that may communicate the H-TDM overlay synchronous timeslot scheme between each other. As shown, node A 1702 includes two line cards 1706 in communication with each other through a switch 1708. Similarly, node B 1704 includes two line cards 1710 in communication with each other through a switch 1712. Communication between the line cards 1706 and between the line cards 1710 may be as described in conjunction with FIG. 16. Similarly, communication between the line card 1706 and the line card 1710 may be as described in conjunction with FIG. 11, 13, or 15. Thus, the node A 1702 may communicate with the node B 1704 through the line cards 1706 and one of the line cards 1710.

While each of nodes A 1702 and B 1704 are shown with only two line cards 1706 and 1710, it is contemplated that any number of line cards may be in communication with each other over each of the switches 1708 and 1710. Further, while each of the line cards 1706 and 1710 are illustrated as having only one ingress port and one egress port, it is contemplated that one or more of the line cards 1706 and 1710 may have multiple ingress and egress ports. Further, while each of nodes A 1702 and B 1704 have a single switch 1708 or 1712, it is contemplated that the switches 1708 and 1712 may be comprised of multiple switching fabrics. For example, the switch 1708 or 1712 may include at least a first switching fabric for switching TDM and HPF data and a second switching fabric for switching BEP data. Such configurations allow the nodes to serve as routers, switches, bridges, or any other type of node within a network.

Figure 18:
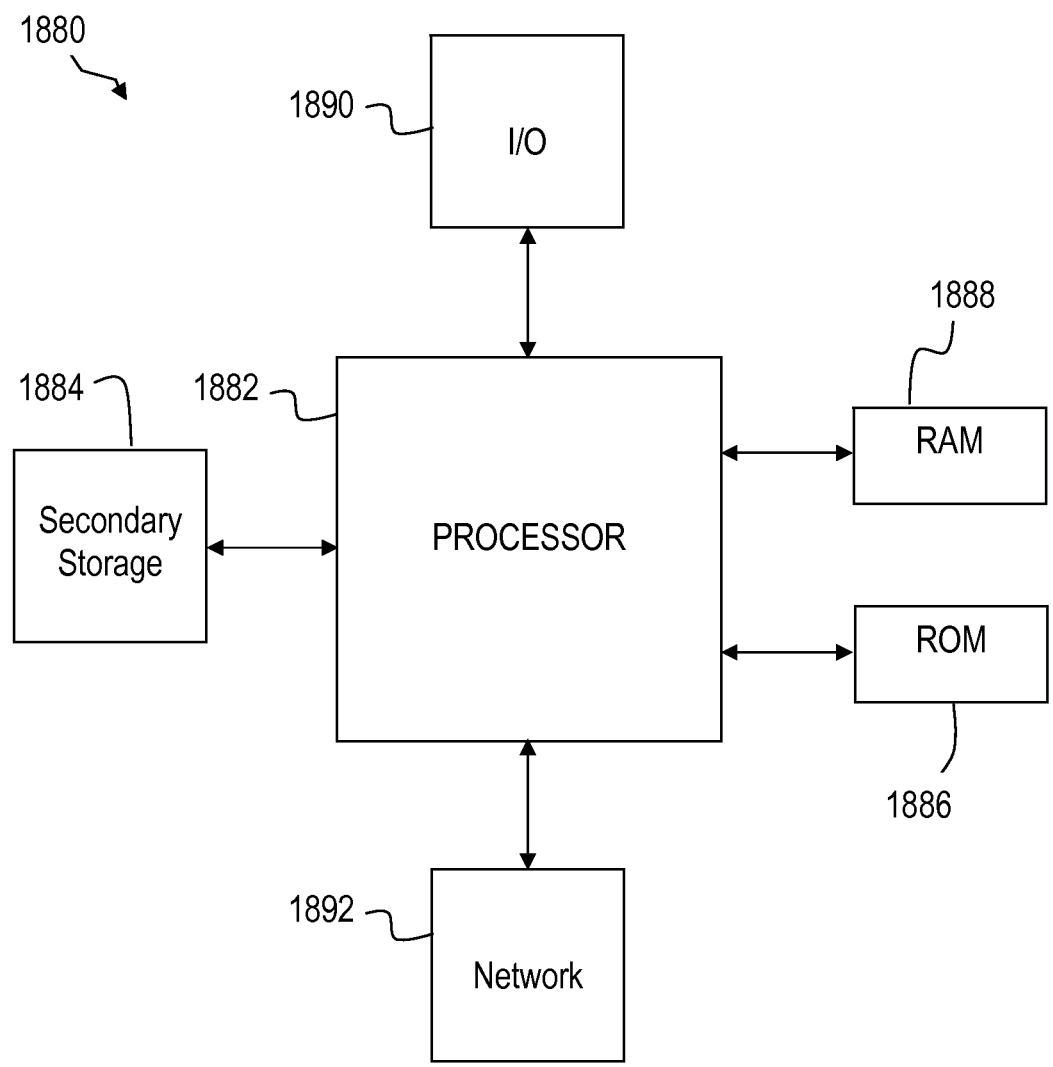
FIG. 18 is an illustration of one embodiment of a general-purpose computer system suitable for implementing the several embodiments of the disclosure.

The systems and methods described above may be implemented on any general-purpose computer with sufficient processing power, memory resources, and network throughput capability to handle the necessary workload placed upon it. FIG. 18 illustrates a typical, general-purpose computer system suitable to implement one or more embodiments disclosed herein. The computer system 1880 includes a processor 1882 (which may be referred to as a central processor unit or CPU) that is in communication with memory devices including secondary storage 1884, read only memory (ROM) 1886, random access memory (RAM) 1888, input/output (I/O) 1890 devices, and network connectivity devices 1892. The processor may be implemented as one or more CPU chips.

The secondary storage 1884 is typically comprised of one or more disk drives or tape drives and is used for non-volatile storage of data and as an over-flow data storage device if RAM 1888 is not large enough to hold all working data. Secondary storage 1884 may be used to store programs which are loaded into RAM 1888 when such programs are selected for execution. The ROM 1886 is used to store instructions and perhaps data which are read during program execution. ROM 1886 is a non-volatile memory device which typically has a small memory capacity relative to the larger memory capacity of secondary storage. The RAM 1888 is used to store volatile data and perhaps to store instructions. Access to both ROM 1886 and RAM 1888 is typically faster than to secondary storage 1884.

I/O 1890 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1892 may enable the processor 1882 to communicate with an Internet or one or more intranets. With such a network connection, it is contemplated that the processor 1882 might receive information from the network or might output information to the network in the course of performing the above-described method steps. Such information, which is often represented as a sequence of instructions to be executed using processor 1882, may be received from and outputted to the network, for example, in the form of a computer data signal embodied in a carrier wave.

Such information, which may include data or instructions to be executed using processor 1882, may be received from and outputted to the network, for example, in the form of a computer data base-band signal or signal embodied in a carrier wave. The base-band signal or signal embodied in the carrier wave generated by the network connectivity devices 1892 may propagate in or on the surface of electrical conductors, in coaxial cables, in waveguides, in optical media, for example optical fiber, or in the air or free space. The information contained in the base-band signal or signal embedded in the carrier wave may be ordered according to different sequences, as may be desirable for either processing or generating the information or transmitting or receiving the information. The base-band signal or signal embedded in the carrier wave, or other types of signals currently used or hereafter developed, referred to herein as the transmission medium, may be generated according to several methods well known to persons of ordinary skill in the art.

The processor 1882 executes instructions, codes, computer programs, scripts that it accesses from hard disk, floppy disk, optical disk (these various disk-based systems may all be considered secondary storage 1884), ROM 1886, RAM 1888, or the network connectivity devices 1892.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. In addition, persons of ordinary skill in the art will appreciate that the term octet as used herein is synonymous with the term byte, and that the octets described herein do not necessarily have to contain eight bits.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by persons of ordinary skill in the art and could be made without departing from the spirit and scope disclosed herein.

What is claimed is:

1. A network component comprising:
a processor, wherein the processor is configured to:
transmit a frame comprising a transport overhead, a timeslot map, and a plurality of octet-sized timeslots, wherein each timeslot is assigned as either a high priority timeslot or a low priority timeslot,
wherein the timeslot map indicates data types located in the timeslots are time division multiplexed (TDM) data, high performance flow (HPF) data, best-effort packet (BEP) data, and data reserved for some other purpose,
wherein a high priority data is carried in the high priority timeslot, and
wherein a low priority data is carried in the low priority timeslot.

2. The network component of claim 1, wherein at least some of the high priority timeslots carry the TDM data.

3. The network component of claim 1, wherein at least some of the high priority timeslots carry the HPF data.

4. The network component of claim 1, wherein the processor is further configured to assign either the HPF data or the TDM data to the high priority timeslots.

5. The network component of claim 1, wherein the processor is further configured to assign the best effort packet (BEP) data to the low priority timeslots.

6. The network component of claim 5, wherein part of the BEP data is transmitted in the frame, and wherein the remaining part of the BEP data is transmitted in a subsequent frame.

7. The network component of claim 5, wherein the low priority timeslots that carry the BEP data are not consecutive within the frame.

8. The network component of claim 1, wherein some of the low priority timeslots represents guard intervals of the frame.

9. The network component of claim 8, wherein transmission of the low priority data carried in the guard intervals is interrupted by a start of frame delimiter (SFD).

10. The network component of claim 1, wherein the processor is further configured to allocate the timeslots as the high priority timeslots based on a maximum amount of bandwidth needed for the high priority data.

11. The network component of claim 1, wherein the frame is transmitted within a synchronization window having a predefined period.

12. The network component of claim 1, wherein the frame is transmitted within a synchronization window comprising a first guard interval positioned before the frame and a second guard interval positioned after the frame.

13. The network component of claim 12, wherein the low priority data is transmitted subsequent to the frame, and wherein transmitting the low priority data comprises placing the low priority data in the second guard interval.

14. A method comprising:
communicating a high priority data and a low priority data in a frame comprising a transport overhead, a timeslot map, and a plurality of octet-sized timeslots,
wherein the timeslot map is communicated after all of the transport overhead,
wherein the timeslot map comprises a pattern of bits that assign the timeslots to carry a voice data, a video data, a best-effort data, or a background data,
wherein each timeslot is assigned to the high priority data or the low priority data,
wherein the high priority data is provided in the timeslots assigned to the high priority data, and
wherein the low priority data is provided in the timeslots assigned to the low priority data.

15. The method of claim 14, wherein at least some of the timeslots assigned to the high priority data communicate a telephonic voice data.

16. The method of claim 14, wherein at least some of the timeslots assigned to the high priority data communicate at least one of a high performance flow data, a real-time data, an audio data, a video data, or a multimedia data.

17. The method of claim 14, wherein at least some of the timeslots assigned to the low priority data communicate at least part of an Ethernet packet.

18. The method of claim 14, wherein the timeslots that communicate an Ethernet packet are not consecutive within the frame.

19. The method of claim 14, wherein the frame is communicated within a synchronization window having a period of about 125 microseconds, and wherein each timeslot in the frame provides about 64 kilobits per second of bandwidth.

20. The method of claim 14, wherein the frame is multiplexed based on a priority of each timeslot, and wherein the frame is multiplexed at an octet level.

* * * * *